(12) United States Patent
Catalano

(10) Patent No.: US 12,039,621 B1
(45) Date of Patent: *Jul. 16, 2024

(54) METHOD AND SYSTEM FOR A MOBILE COMPUTERIZED MULTIPLE FUNCTION REAL ESTATE USERS ASSISTANT

(71) Applicant: Donald Charles Catalano, Northport, NY (US)

(72) Inventor: Donald Charles Catalano, Northport, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/525,027

(22) Filed: Nov. 12, 2021

Related U.S. Application Data

(63) Continuation of application No. 16/563,901, filed on Sep. 8, 2019, now Pat. No. 11,176,627, which is a continuation-in-part of application No. 15/985,574, filed on May 21, 2018, now Pat. No. 10,410,303, which is a continuation-in-part of application No. 13/844,291, filed on Mar. 15, 2013, now Pat. No. 9,978,109, which is a continuation-in-part of application No. 13/103,485, filed on May 9, 2011,
(Continued)

(51) Int. Cl.
| | |
|---|---|
| *G06Q 50/00* | (2024.01) |
| *G06Q 50/16* | (2012.01) |
| *G06V 20/00* | (2022.01) |
| *G07C 9/00* | (2020.01) |
| *G06F 16/29* | (2019.01) |

(52) U.S. Cl.
CPC ........... *G06Q 50/167* (2013.01); *G06V 20/36* (2022.01); *G06V 20/39* (2022.01); *G07C 9/00309* (2013.01); *G06F 16/29* (2019.01)

(58) Field of Classification Search
CPC ........ G06Q 50/16; G06Q 30/02; G06Q 30/06; G06Q 30/0261; G06F 17/30041; G06F 17/30241; G06F 3/0346; G06F 17/30061; G06T 2210/04
See application file for complete search history.

(56) References Cited

U.S. PATENT DOCUMENTS

| | | | |
|---|---|---|---|
| 2005/0086158 A1* | 4/2005 | Clare ..................... | G06Q 30/02 705/38 |
| 2012/0246024 A1* | 9/2012 | Thomas ................. | G06Q 30/06 705/27.1 |

OTHER PUBLICATIONS

Realtor.com "Street Peek", Aug. 28, 2017: https://www.realtor.com/homemade/streek-peek-and-sign-snap-use-augmented-reality-and-image-recognition-to-find-your-home/ uploaded May 21, 2018.

* cited by examiner

*Primary Examiner* — Scott S Trotter
(74) *Attorney, Agent, or Firm* — Stephen E. Zweig

(57) ABSTRACT

An integrated computerized system, method, and non-transitory computer readable media oriented to mobile computerized devices such as tablet computers and Smartphones, for assisting users in conducting site visits and tours to various real properties of interest. The method comprises various software modules, including software modules to assist in various numeric comparative property evaluation schemes, modules to automatically present building floor plans and other information at defined tour locations, and modules to show images or CAD drawings of proposed property modifications (often using augmented reality techniques). Other modules may additionally help manage the tour, including semi-automatic notification of tour itinerary changes, management of tour route instructions, and audio or text narration during selected portions of the tour.

28 Claims, 15 Drawing Sheets

Related U.S. Application Data now Pat. No. 10,062,127, said application No. 15/985,574 is a continuation-in-part of application No. 13/844,238, filed on Mar. 15, 2013, now Pat. No. 10,445,843.

(60) Provisional application No. 61/473,139, filed on Apr. 7, 2011, provisional application No. 61/621,077, filed on Apr. 6, 2012, provisional application No. 61/794,372, filed on Mar. 15, 2013.

Figure 1 Tablet computer example of a personal mobile computerized device

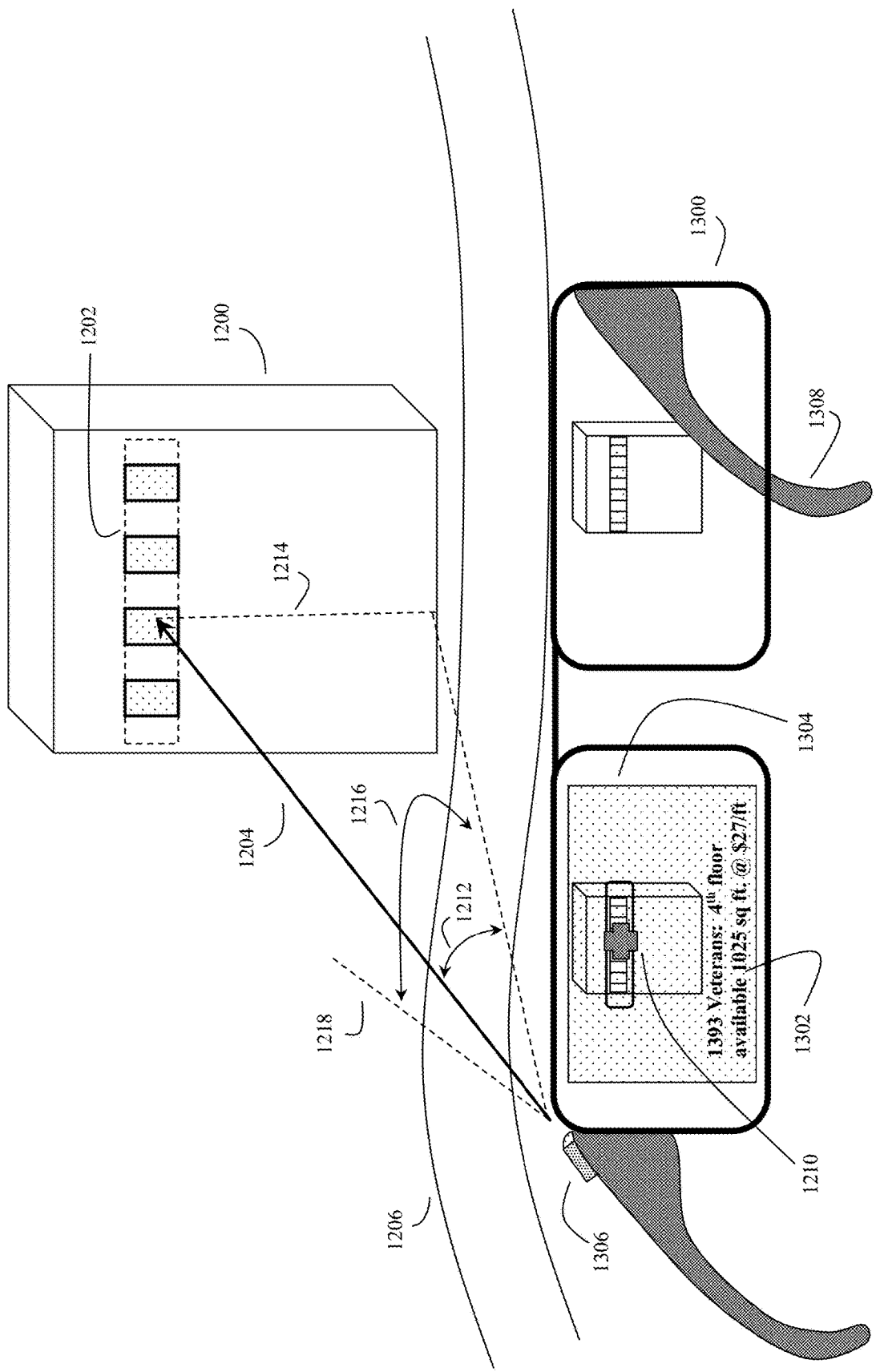

METHOD AND SYSTEM FOR A MOBILE COMPUTERIZED MULTIPLE FUNCTION REAL ESTATE USERS ASSISTANT

CROSS REFERENCE TO RELATED APPLICATIONS

This application is a continuation of U.S. patent application Ser. No. 16/563,901, filed Sep. 8, 2019, now U.S. Pat. No. 11,766,627 issued Nov. 16, 2021; application Ser. No. 16/563,901 was a continuation in part of U.S. patent application Ser. No. 15/985,574 METHOD AND SYSTEM FOR A MOBILE COMPUTERIZED MULTIPLE FUNCTION REAL ESTATE USERS ASSISTANT, filed May 21, 2018, now U.S. Pat. No. 10,410,302 issued Sep. 10, 2019; application Ser. No. 15/985,574 was a continuation in part of U.S. patent application Ser. No. 13/844,291 "METHOD AND SYSTEM FOR A MOBILE COMPUTERIZED MULTIPLE FUNCTION REAL ESTATE BROKER'S ASSISTANT", filed Mar. 15, 2013, now U.S. Pat. No. 9,978,109 issued May 22, 2018; application Ser. No. 13/844,291 claimed the priority benefit of provisional patent application 61/621,077, "METHOD AND SYSTEM FOR A MOBILE COMPUTERIZED MULTIPLE FUNCTION REAL ESTATE BROKER'S ASSISTANT", filed Apr. 6, 2012; application Ser. No. 13/844,291 was also a continuation in part of application Ser. No. 13/103,485 entitled "SYSTEM AND METHOD OF MANAGING AND OPTIMIZING COMMERCIAL REAL ESTATE LEASES", filed May 9, 2011, now U.S. Pat. No. 10,062,127 issued Aug. 28, 2018; application Ser. No. 13/103,485, in turn, claimed the priority benefit of provisional application 61/473,139 entitled "SYSTEM AND METHOD OF MANAGING COMMERCIAL REAL ESTATE LEASES", filed Apr. 7, 2011; application Ser. No. 13/844,291 also claimed the priority benefit of provisional application 61/794,372 entitled "Reoptimizer Walkthrough", filed Mar. 15, 2013; application Ser. No. 15/985,574 was also a continuation in part of U.S. patent application Ser. No. 13/844,238, "SYSTEM AND METHOD OF MANAGING AND GEOGRAPHICALLY OPTIMIZING PROPERTY LEASING AND PURCHASING", filed Mar. 13, 2013, now U.S. Pat. No. 10,445,843 issued Oct. 15, 2019; the entire contents of all of these applications are incorporated herein by reference.

BACKGROUND OF THE INVENTION

Field of the Invention

This invention is in the field of software and systems for managing real estate management and real estate transactions.

Description of the Related Art

Real estate brokers and/or their clients and other real estate users spend a considerable amount of time evaluating various real estate properties of interest to the client. Among other activities, they need to better define which property characteristics are most important to the user's or client's respective needs. Such evaluation methods, which are typically based on helping to define and standardize various evaluation criteria, and then further helping to define and rate the relative importance of these criteria, were discussed in detail in parent patent application Ser. Nos. 13/103,485, 13/844,291 and 13/844,238, the entire contents of which are incorporated herein by reference. In this parent patent application, these evaluation criteria were often referred to as "Key Site Driver numeric descriptors", which were ranked according to "Key Site Variables". A final property ranking was defined according to a "Key Site Driver function" ultimately producing a "Key Site Driver number" (here occasionally referred to in the alternative as a Key Site Rating or KSR number). This ultimate number was useful in helping both the broker and client compare the relative merit of various properties. "Key Site Drivers" were often referred to in abbreviated form as KSD, and this terminology will be used in this application as well.

Real estate brokers and other real estate users do other activities as well. For example, they also often spend a considerable amount of time taking clients through physical (real world) tours of various real properties of interest. Such tours are often logistically demanding. In a typical day tour, often a number of different properties of interest will be covered. Some of these tours may be pre-planned, thus the broker or other real estate user must first construct a tour itinerary covering visits to these multiple properties. Additionally, such property visits usually have to be coordinated with other brokers, owners, or managers of the visited property. This is because these other brokers, owners, or managers often wish to be on hand to help explain the particular features of their particular property. Other property tours may be random or spontaneous—for example, a couple may spontaneously decide to drive through a region and look at residential houses of interest.

Even pre-scheduled tours often do not go exactly according to the previously established itinerary. Traffic, unpredictable client interest or disinterest in a particular property, changes in client schedules, and the like, can often crop up unpredictably. As a result, even pre-planned tour itineraries must often be dynamically altered as the tour progresses. This generates additional work. For example, during a tour, a broker or broker's assistant must often spend time on a cell phone rescheduling visit times. As a result, methods to reduce the labor involved in such tours, or the efficiency of such tours, regardless of if they are preplanned or spontaneous are highly useful for this field.

In many cases, the client or other real estate user may seek to remodel or otherwise modify the present configuration of the property. For example, the client or user may wish to move walls, add walls, add additional fixtures, or change landscaping. To facilitate this, often the showing broker or the property brokers/managers often provide images or computer-aided design (CAD) drawings of these proposed changes. However often clients and other real estate users have trouble fully visualizing these proposed changes.

Various methods have been proposed to assist in some of these broker activities. For example, Lamont, in U.S. Pat. Nos. 7,652,594 and 8,072,353 proposed a dynamic content design and delivery software architecture for providing location-specific information to users in the field.

Blumberg, in U.S. Pat. Nos. 6,385,541; 6,496,766 and 7,072,665 proposed a wireless position-based information access device and method of searching that would provide location-centric information from a more distant information system, and communicate this to the user.

Imamura, in U.S. Pat. No. 7,080,096 proposed a housing space-related commodity sale assisting system, method, program and recordable program media. The system could provide real estate floor plans and other information to prospective clients.

Morse, in U.S. Pat. No. 7,392,208 proposed an electronic property viewing method for providing virtual tours of real estate via a public communications network.

One drawback of such prior art systems is that they tended to be dependent on having an active connection to the Internet for usage. As any mobile phone user can attest, dropped calls, and dropped Internet connections are a daily reality. This is a particular problem when a mobile wireless device user first enters a property such as a building, and then tries to rapidly establish an Internet connection. Additionally, if large amounts of data need to be rapidly accessed, delay times due to the limiting speeds of wireless connections can also tend to detract from the utility of such electronic methods.

Thus, in spite of the various prior art in the area, a real estate brokerage and/or end-user client system retains many tedious and time-consuming elements, and further automation in this field would be highly useful.

BRIEF SUMMARY OF THE INVENTION

The invention is based, in part, on the insight that despite previous automation efforts, many of the real estate transaction and management functions which are carried out by various individuals such as human real estate brokers, real estate broker's assistants and/or the end-users (clients, users) of the real estate, and other real estate users are inherently capable of more effective automation. Because data often must be rapidly passed from one person to another and from one use to another, methods of increased integration between these various activities are also desirable.

As previously discussed, real estate brokers spend a considerable amount of time helping clients evaluate various real estate properties of interest, and helping clients to better define which property characteristics are most important. In addition, the clients themselves can spend an inordinate amount of time getting selecting the best comps, especially when, as is often the case, there are multiple stakeholders involved in the decision. In some embodiments if this disclosure, as will be discussed, various augmented reality methods may be used to help real estate users, often equipped with various types of personal mobile computerized devices such as smartphones, tablet computers, augmented reality headsets, and the like further understand important property information in the context of real-world real estate tours.

Additionally, in some embodiments of this disclosure, the Key Site Driver (KSD) concepts previously discussed in detail in parent application Ser. No. 13/103,485, the contents of which are incorporated herein by reference are further extended and become invaluable to both the real estate brokers assisting the client, and the clients/users themselves. In other embodiments, the KSD methods need not be used.

Although the specific KSD methods disclosed in the present disclosure generally adopt and affirm the KSD teaching of Ser. No. 13/103,485, the present disclosure further extends the basic KSD concepts to further include leasing and non-leasing (e.g. purchase, management) functions. The scope of the KSD concepts is also further expanded to further include both commercial real property, residential real property, and even unimproved land type real property. Indeed, in some cases, which will be discussed in more detail in subsequent disclosures, the KSD concept may be further extended to further include client rakings of landlords, managers, or brokers for such real property as well.

The invention is also based, in part, on the insight that although clients and brokers can of course understand and alter various KSD criteria and functions while not being physically present at any particular real property of interest, in many situations, it is useful to perform such KSD evaluations while the client or broker or other real estate user is physically visiting the property. This way, details that might not otherwise be apparent from photos, videos, written descriptions and statistics can become evident, and this, in turn, can result in more satisfactory property evaluation and KSD rankings. Thus it is useful to provide methods, devices, and systems that facilitate such on-site rankings.

Further, as previously discussed, real estate brokers and/or the end-user clients typically go through a considerable amount of time and effort taking clients through real-world tours of various real estate sites. Here previous efforts to simplify and automate the process have not been fully successful, and further advances in automated methods to reduce this workload would be useful.

The invention is also based, in part, on the insight that expanded mapping and automated tour assistance functionality is also desirable. During real estate tours, real estate brokers and/or the clients or other users should, of course, be informed about the relative location of the various properties on a map. This allows the real estate broker to actually show these properties to the client, and/or for the client or user themselves to visit the various properties. Ideally, however, an improved system would also, in some embodiments, such as when a scheduled tour itinerary exists, determine an efficient, multiple destination, tour route that not only includes these various locations, but other locations as well. In some embodiments, it may be useful to have the system provide information about these other locations as well.

Having a real estate system that is aware of these other locations is also desirable because real estate tours often have to accommodate other places of interest, such as restaurants or nearby facilities (e.g. transportation facilities, local employee housing, recreational facilities and the like). Further, the tour itinerary, if one exists, may often dynamically change during a tour (e.g. depending on traffic and changes in client interest or schedule), and these changes should ideally also be managed by the system. Indeed, as previously discussed, sometimes the tour will entirely spontaneous in nature. Additionally, the broker is often expected to be a source of useful information on the area, and will often give clients a running narrative of such useful information while driving in route to the next tour destination. Thus additional methods to automate or at least partially automate these functions would also be useful.

The invention is also based, in part, on the further insight that prior art methods to assist clients and other real estate users in evaluating between multiple real estate properties, and/or various types of improvements in these multiple real estate properties, are also inadequate. For example, for both commercial and residential real estate, when the properties are buildings, each building will have its own building floor plan, and if the building has multiple stories (levels, floors), each level will have its own particular level floor plan, as well as other floor level specific information. Some sections of these buildings or building levels may be of interest to the client (perhaps because they are available for lease or sale), while other sections may not be of interest. As the client tours each portion of the property of interest, the broker should ideally provide the client with a graphical representation of the floor plan or other layout of that property. This requires juggling information pertaining to these various floor plans and other floor information. Generally, the quicker that this information can be provided to a client at the exact time that the client wants it, the better.

Additionally, as previously discussed, in many cases, the client may seek to remodel or otherwise modify the present configuration of the property (e.g. moving walls, changing landscaping, changing fixtures or furniture). Although often brokers, landlords, or managers may provide images or computer-aided design (CAD) drawings of these proposed changes, clients often have difficulty looking at a property, and then imagining the ultimate impact of these proposed changes to the property. Thus methods to assist in this property modification imagination or visualization process, such as various augmented reality methods, would also be of considerable use and commercial importance in this area, and here such concepts are explored in more detail.

As will be discussed, such augmented reality methods can be particularly useful either on a stand alone basis, or as a component of an integrated multiple function automated real estate broker system. In the invention's integrated method and system for example, clients and other users (e.g. persons interested in real estate who may or may not be working with a broker) may evaluate multiple sites, compare many different factors, and also use augmented reality to better understand how each site would be customized to meet that client's particular needs. Even if the user's simply wish to randomly drive around and look at properties without any plan, and without any basis for comparison, the invention's augmented reality methods described herein can also allow such users to rapidly acquire information regarding one or more real estate properties in a tour area of interest.

The invention is also based, in part, on the insight that modern personal or mobile computerized devices, either on a stand-alone basis or as part of a wireless networked system with various other remote computer servers (such as remote internet servers), now have sufficient computing power and storage capacity to perform many of the above-desired functions. Thus methods and systems that implement, either singly or preferably as an integrated system, one or more of the above concepts would be highly useful in the real estate field.

BRIEF DESCRIPTION OF THE DRAWINGS

FIG. 13 shows how the invention, here implemented on an augmented reality headset type personal/mobile computerized device, can allow the user to view the outside world while, at the same time, displaying at least some information pertaining to the real estate property of interest as an augmented reality overlay on the augmented reality headset's display. In some embodiments, the headset may also have video cameras, as well as orientation or pointing type sensors.

DETAILED DESCRIPTION OF THE INVENTION

Figure 1:
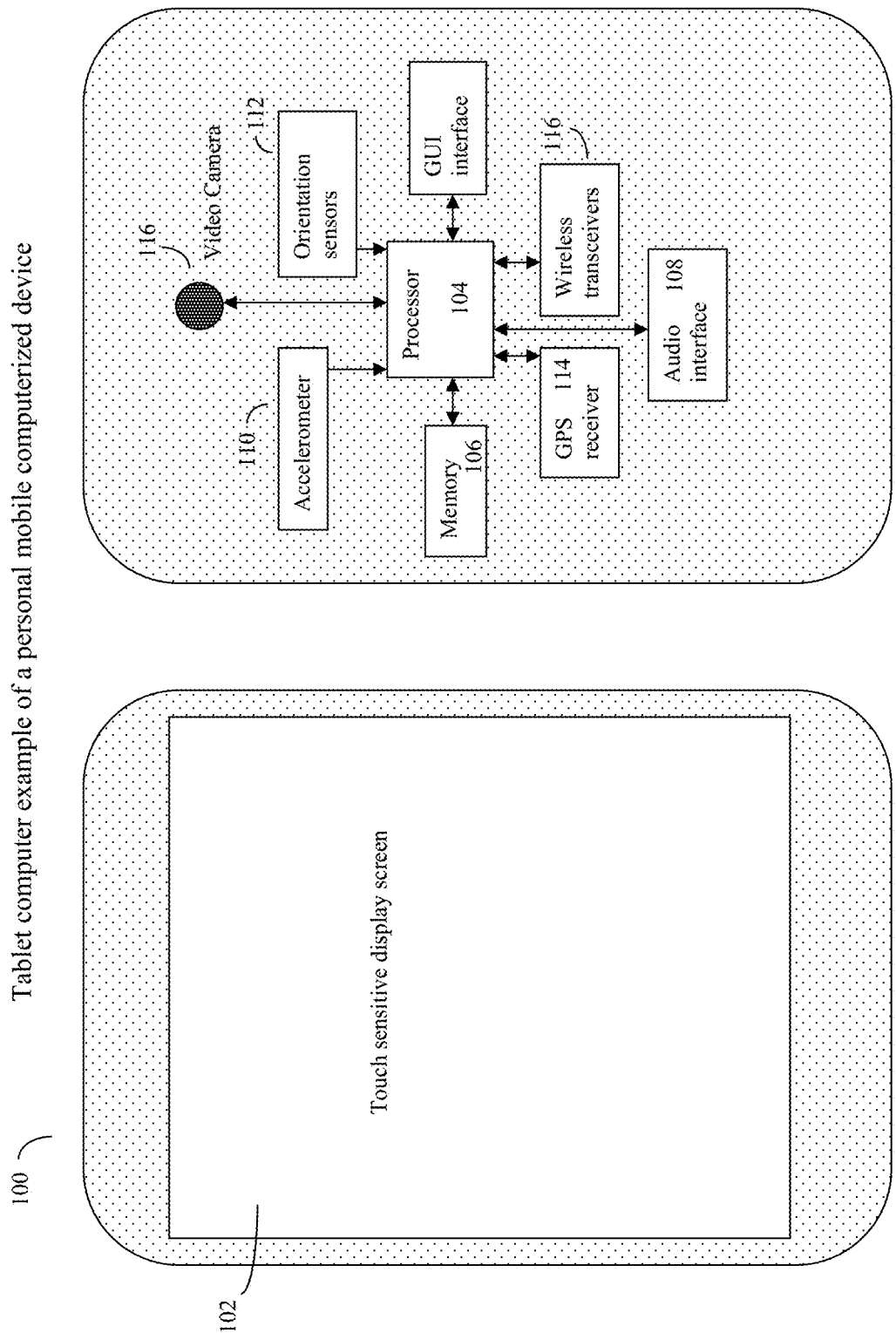
FIG. 1 shows an example of a tablet computer type mobile computerized device that may be used to execute the method's various software functions.

Abbreviation: In this specification, the word "comp" is used as an abbreviation of "comparable", which is typically a property that the client or broker wishes to use to compare to an ideal or reference property.

Nomenclature: In this specification, the overall numeric Key Site Driver (KSD) rating scheme previously discussed in specification Ser. No. 13/103,485 is occasionally discussed here in the alternative as a KSR rating in order to more clearly distinguish the function of the various individual Key Site Driver variables from the overall function of the various Key Site Driver variables.

The term "tour" generally refers to real-life physical visits to, or at least within direct eyesight distance of, at least one physical real estate property of interest. Such tours may or may not have an itinerary chosen in advance.

The term "user" is a generalization of the human user that is using the invention. The user can be a broker, a client of a broker, or other human user, such as anyone interested in real estate that may, or may not, be working with a broker. Similarly a real estate agent can be any person authorized to perform services for a property owner. Thus brokers, managers, salespeople and the like are a type of real estate agent.

The term "personal mobile computerized device" is a generalization of the concept of a handheld mobile computerized device. This more general term can encompass smartphones, tablet computers (to be discussed shortly), as well as other devices such as augmented reality headsets, augmented reality glasses, and the like. Examples of augmented reality headsets can include systems such as Google Glass, Microsoft HoloLens, and the like. Such augmented reality headsets typically are head mounted devices with at least one see-through display (often mounted on one or more transparent supports or lenses) computer processor, and often additional devices such as orientation sensors, video cameras, and often wired or wireless connectivity to other devices (such as handheld computerized devices) that may provide additional computing power, longer range cellular transceivers, GPS receivers, and the like. Alternatively, these devices may be incorporated into the augmented reality headset as well. Thus the term "augmented reality headset" should be considered to read on a head-mounted device with see-through optics that otherwise has the same functionality as the smartphones and tablet computers discussed below, with the exception that the headset's built-in display may not be a touch-sensitive display. Instead, alternative input methods, such as voice recognition systems, and/or alternative touch sensor locations, may be used.

In some embodiments, the invention may also comprise non-transitory computer readable media comprising program instructions for causing at least one processor to perform the various methods described herein. This memory may comprise solid state memory (including Flash memory, RAM, ROM memory, and the like), magnetically encoded memory (e.g. hard drive memory), and all other types of memory capable of storing computer program information in a non-transitory manner.

FIG. 1 shows an overview of a typical mobile computerized device that will be used to implement the system.

In some embodiments of the invention, the computerized device (100) may be a tablet or cellular phone computerized device, exemplified by the popular Apple iPad and iPhone devices, the Android cellular phone and tablet devices, and the Microsoft family of tablet computers and mobile devices. In general, such devices normally comprise a high-resolution display screen (102), often equipped with touch sensors, which often functions as the primary or secondary graphical user interface for the device. The devices additionally usually comprise at least one processor (104) (which may have one or more cores and graphics units), memory (106) (often approximately in the gigabyte range or higher), speakers or audio output jacks (108), microphones or audio input jacks. The devices often also comprise various accelerometers (110) or other types of motion and position sensors (112) capable of detecting device movement and orientation on the local scale. The devices also often comprise Global Positioning Receivers (114) capable of with, at least when supplemented by optional wireless signals from the Wide Area Augmentation System (WAAS), to pinpointing device position to an accuracy within a few feet or better. The devices may also comprise video cameras (116).

Such devices additionally often comprise one or more wireless transceivers (116). These wireless transceivers can include cellular phone transceivers (e.g. such as 3G, 4G, 5G transceivers), WiFi transceivers, Bluetooth™ transceivers and the like. In some embodiments, these transceivers can, in turn, provide device connectivity to the Internet, and hence to various servers throughout the world.

Nowadays these same portable devices, along with laptops and desktops, augmented reality headsets, and the like are capable of highly accurate voice recognition as well. The level of accuracy has most recently improved to finally allow functional control and interaction with the host computer through voice control alone. In some embodiments, the system may be configured to operate by voice control, at least as an optional user input method.

The invention will thus typically consist of various computerized methods that are implemented in software, often as various software modules. In some embodiments, all of the invention's software may be loaded onto the personal or mobile computerized device, and once loaded with data, the device and software will then be capable of performing most or all of the functions discussed herein as a stand-alone device (e.g. without the assistance of wirelessly connected remote computer servers). Such stand-alone capability is useful, as real estate tours often cross into areas, both within buildings and between buildings, where wireless connectivity to the Internet is not always either instantly available or reliable. In other embodiments, however, some of the various software functions or modules may be offloaded to one or more remote servers, which can communicate with the personal or mobile computerized device via wireless data links (e.g. 3G, 4G, 5G wireless cellular phone links, WiFi links, and so on, often through the Internet).

In general, the more software modules and functions that the system performs, the better. Although for clarity, the individual software modules that may make up the system are often discussed in this specification separately, it should be understood that in a preferred embodiment, often a number of these software modules will function, preferably in an integrated manner, on the same device. These software modules can be combined in various permutations, and here all such permutations are contemplated, subject to the general consideration that integrated systems with a larger number of modules are typically preferred.

Figure 2:
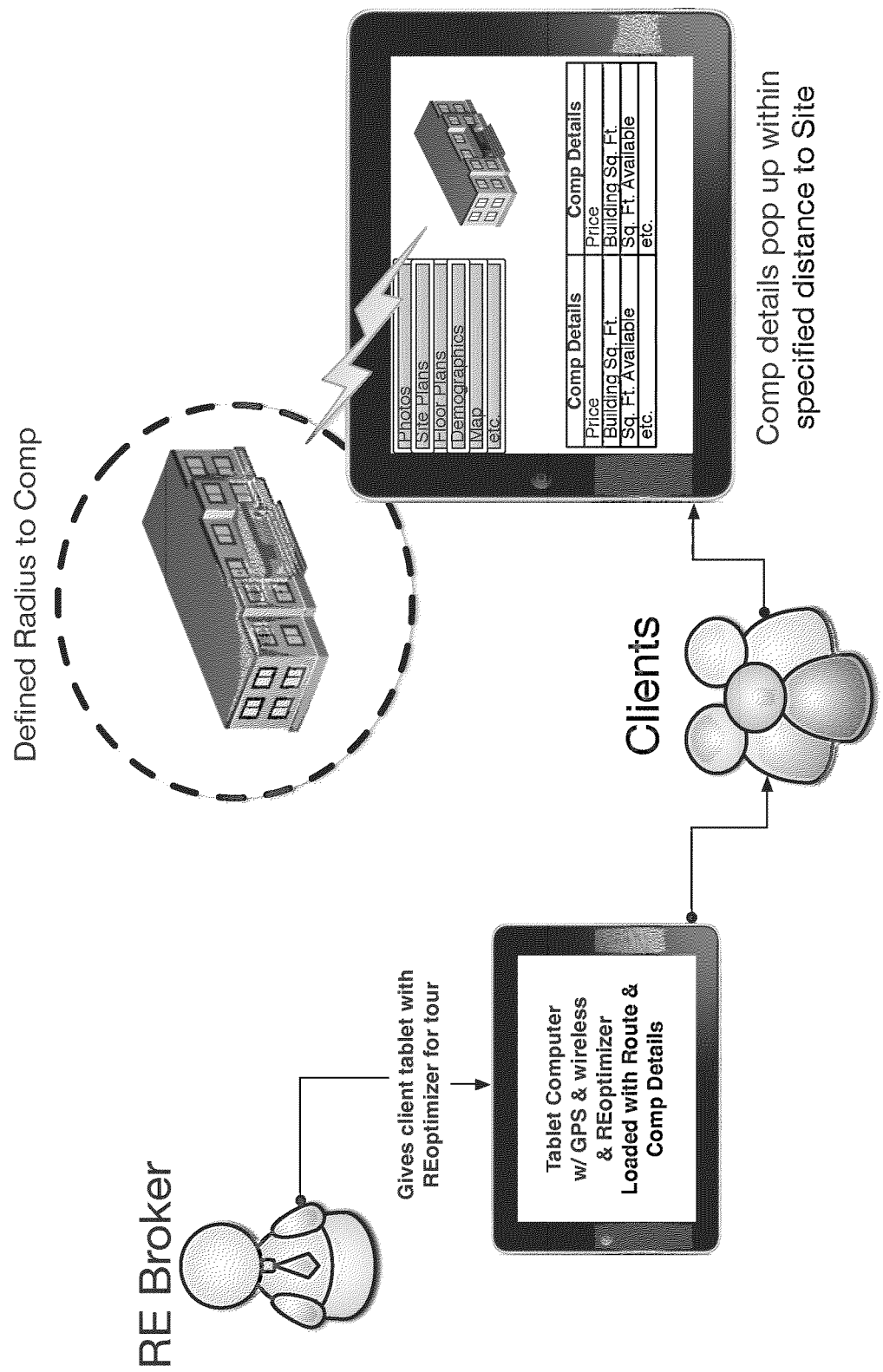
FIG. 2 shows an example of how the system, when implemented on a tablet computer (here an iPad) may function as an automatic broker (autobroker).

FIG. 2 shows one embodiment of the system, here providing an example of how the system, when implemented on a tablet computer such as the iPad, may function as an automatic broker (autobroker). In use, for example, a human broker may provide the tablet computerized device, either pre-loaded with the software that implements the invention's methods, and with appropriate real estate property data also preloaded, to a client, often during a real estate tour. Alternatively the device may be configured to wirelessly download portions of the software and relevant data from remote servers during use as needed. In either event, the device and software can then assist the broker and clients in their subsequent tours, property evaluation, and decision-making.

In the FIG. 2 example, as discussed in parent application Ser. No. 13/844,291 filed Mar. 15, 2013, and in parent provisional application 61/621,077 filed Apr. 6, 2012, as the clients approach a particular real estate property of interest, the GPS device in the tablet or other type personal mobile computerized device detects when the clients are within suitable proximity of the property (e.g. $\frac{1}{10}$ mile), and the system then uses this GPS proximity data as a cue to then display information pertaining to this particular property. Other suitable proximity distances can also be set, however. In some embodiments, such as when the user is using the personal mobile computerized device to point at the particular real estate property of interest, "suitable proximity" can be any distance from the user to the property so long as the property is directly visible to the user in the real world (i.e. the user can make direct eye contact with the property). This enables a clear pointing vector to be established between the property being pointed at, and the user (who is holding or wearing the personal mobile computerized device), so that the system can use the location of the personal mobile computerized device, the pointing vector, and map location data to unambiguously calculate what property, or portion of the property, the user is pointing at.

Alternatively, of course, the user may request this information directly, and from any location, by entering the appropriate commands to the device's graphical user interface (GUI).

The property information initially presented by the device may contain, for example, one or more photos, as well as other information pertaining to the property itself. In some embodiments, the device may use the KSD information to additionally show how this particular property compares to a reference or ideal property of interest, or to another comp property of interest.

In many embodiments, the device will often give users access to other screens that, for example, allow the user to view or input KSD information pertaining to the property at hand. In other embodiments, the system may additionally use augmented reality methods to allow clients to visualize both the present property, as well as potential improvements to the property, at the same time. These augmented reality concepts will be discussed in more detail shortly.

In another embodiment, a real estate broker, property manager or owner may leave virtual brochures of the Comp that are either pre-stored in the system and displayed when the client is at the location and the geographical location module (GPS, WiFi address, cell tower triangulation, Bluetooth, etc.) triggers the display of such brochure. As yet another alternative, the client can bring up such information by scanning a barcode, such as QR code, which may be affixed to either the property site or to various property owner/manager informational materials. Other devices such as RFID tags, near field communication chips (NFC), and essentially any other wireless, optical, or other location identification method may be used. Either way, the client would then be able to access multi-media information about the Comp that is either pre-stored or downloaded real-time from the Internet (i.e.: a web URL).

Further, at least users with adequate authorization, such as the real estate broker, property manager, or owner, can also use the above methods to grant access to the property—e.g. with electronic keys, wireless activated locks, and the like. Thus a user with adequate authorization can use the invention's software, in conjunction with embedded NFC or RFID or other short-range identification functionality, to swipe locked doors and gain access.

In its most basic embodiment, the invention may be a computerized method of conducting real estate tours using a personal or mobile computerized device with at least one processor, memory, a graphical or augmented reality type user interface, a GPS receiver, and a wireless transceiver. This basic embodiment of the invention may operate by first loading real estate property information pertaining to a reference or ideal real estate property, as well as the position of the at least one real estate property, into the devices' memory. Alternatively, this information may be loaded from remote servers when the user is within a certain physical proximity of the property.

When KSD methods are desired, the invention may also allow the loading of various types of real estate property information pertaining to at least one comp real estate property, and the positions of the at least one real estate property, into the device's memory. This loading into memory can either be a pre-loading process done before the tour starts, or it can be a dynamic "as needed" loading process using wireless access to remote servers, or some combination of pre-loading and dynamic loading.

Here the idea is that, at least in a broker/client context, a client evaluation of any given property of interest, e.g. a "comp" can be facilitated if the client can compare this "comp" to either a reference site that the client currently is using (e.g. a previous commercial lease, or a previous private residence), or an idealized site that may or may not exist, but which would embody all favorable criteria that the client could possibly hope to obtain. As previously discussed, in both cases, these various types of information may either be provided by a remote wireless link from, example a server that stores this information, or alternatively may be provided by other means, such as direct wire input (e.g. via a USB cable), by removable memory chip, by direct data entry, or by other means.

In a simple but KSD enabled, embodiment of the invention, the personal or mobile computerized device will then display, for at least the reference or ideal real estate property, or at least one comp real estate property, at least some of the real estate property information on the device's graphical user interface. If the KSD functionality is not desired, such reference and comp real estate property need not be either loaded into device memory or displayed.

In various preferred embodiments, however, the method and device may do much more than this, and instead will be integrated with various additional software modules that perform other functions as well.

The method and device may, for example, assist the client in evaluating and entering KSD data for various sites. Alternatively or additionally, the method and device can do one or more other functions such as automatically displaying floor plans and other floor specific information, displaying augmented reality enhanced versions of the property while the client (or broker) is looking around, and do one or more functions to help the broker or client or other user manage the tour itinerary (if there is one). Indeed, the method and device can even help perform automated site tours by providing audio narrative commentary, as desired.

Note that although many of the examples in this specification focus on commercial real estate property, often using leased commercial real estate as a specific example, these examples are not intended to be limiting. In general, these concepts disclosed herein can be used for any type of real estate management or transaction function, including simply looking at property with no intention of purchase or rental, and can be used for commercial real estate, residential real estate, or even unimproved land type real estate. Again, as previously discussed, the user need not be working with a broker but instead can be any human user who is interested in obtaining real estate information.

In some embodiments of the invention, such as broker/client tours that may have a more formal itinerary, it may be useful to include software modules that help manage the broker or client tour. As previously discussed, for these tours, it is often important to contact other brokers or managers (e.g. landlords, owners, or other property managers) of the property of interest in advance in order to schedule these visits. However plans often change, and here the invention's methods can also help keep all the parties in the loop if the tour plans change.

In this embodiment, tour itinerary information pertaining to the times of visiting and order of visiting of the various properties of interest may be loaded into the device memory, along with the contact information (e.g. telephone numbers, email addresses, and the like) of the brokers or managers (e.g. landlord or other property manager) for these properties. In this mode, the device may additionally often display a tour itinerary of these various properties on the device's graphical user interface (display screen), and allow the user to select, deselect or change the times of visiting and order of visiting of the various properties.

As previously discussed, the invention's automated site tour software modules and methods may accept tour itinerary information pertaining to the times of visiting and order of visiting of the various properties that can be loaded into the device's memory, either in advance or through wireless connection to remote servers as needed.

In the automated site tour mode, the system may display a tour itinerary of the properties on the device's graphical user interface, and allow the user to select, deselect or change the times of visiting and order of visiting of the various properties. Depending on the selections, the device will often then be configured to display a tour route for either the original or the revised tour itinerary. The device may also be configured to make useful suggestions regarding tour route optimizations, such as proposing time-optimized travel routes. In some embodiments, the device may even be programmed to suggest potential changes in the itinerary to reduce travel time, or otherwise optimize the tour.

Just as a human real estate agent will often inform clients about the area and the real estate property while driving to a particular property site of interest, so too in some embodiments, the invention may also provide software modules that also provide audio, video, or text-based narration. This narration may be prerecorded, or in some embodiments may be provided on a real time basis, thus enabling an interactive discussion about the property between the user of the invention and a representative of the property of interest (e.g. brokers, salespeople, owners, landlords, managers, etc.) In some embodiments, to implement this functionality, the broker or representative may load audio, video or text descriptions describing the characteristics of the real estate itself or regions surrounding the real estate locations into the device (again either in advance or as needed by wireless connection to remote servers). The device software can then be optionally programmed to use the location information provided by the device's GPS receiver device to select when these audio or text descriptions should be output on the device's speaker (or other audio output device) and/or in the device's graphical user interface. This way, for example, if the broker has a schedule conflict, the broker can, for example, pre-record the narrative, give the device to the client or a broker's assistant, and the device can, in turn, produce the desired narration while the client is traveling.

In other embodiments, the device software may be configured to use either the present location of the device (and user) to query a remote server database for additional information about the real estate near the user or regions surrounding the real estate near the user, and upload and output this information as well. In some embodiments, such as when the device is configured to allow the user to point at real estate of interest (see FIGS. 12 and 13), the device software may be configured to allow the user to point the device at a region of interest, and use the computed location of the region of interest (as computed by the pointing vector and present location of the user/device) to query a remote server database for such information about the pointed at region of interest (e.g. the real estate) or regions surrounding the pointed at region of interest.

Figure 3:
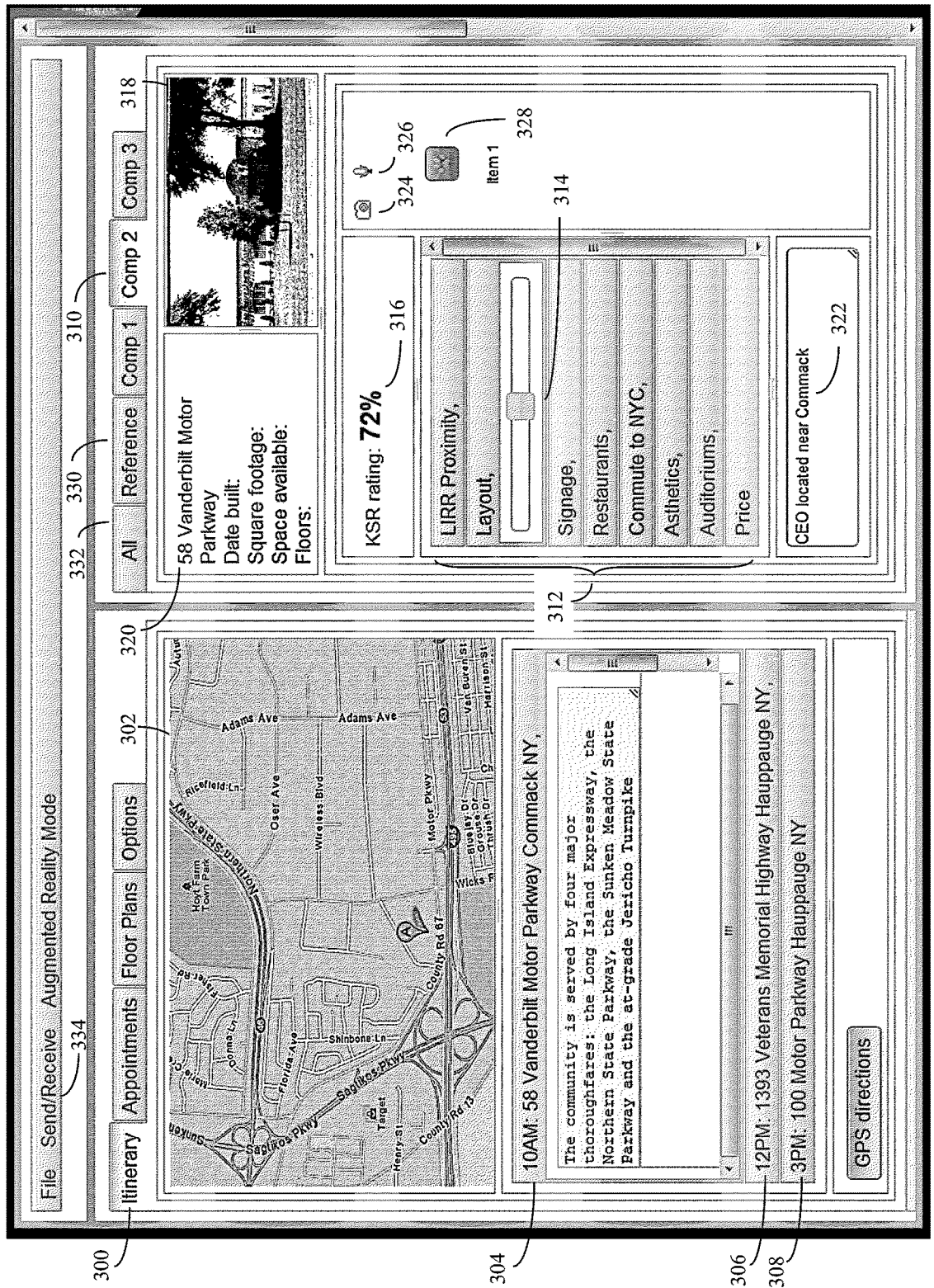
FIG. 3 shows a screenshot from an interface mock-up of the invention, here showing how the invention's itinerary module can help organize the real estate tour schedule by time, give the client some background information on a first property, while also allowing the client to simultaneously review the first property on the tour in the context of other properties.

FIG. 3 shows a screenshot from a screen-mockup of the invention, implemented in an open source HTML5 based design software system (Magetta). This screenshot shows how in some embodiments, the invention's itinerary module can help organize the real estate tour schedule by time, give the client some background information on a first property, while also allowing the client to simultaneously review the first property on the tour in the context of other properties.

This itinerary module (300) may, for example, show a map of the site or sites to be visited (302), and at least the day's schedule (304)-(308). Here, for example, to conserve limited screen space on a touch-sensitive tablet such as the iPad, the system may show the itinerary in the form of an accordion module that opens up and exposes further detail upon user touch, and then closes upon a second user touch thus conserving valuable screen space. Here the user has touched on the first scheduled stop of the day (304), a 10:00 AM stop at 58 Vanderbilt Motor Parkway, Commack NY. Here the itinerary can provide additional commentary on this site.

Note further that the KSD evaluation properties of this invention may implement the teachings of Ser. No. 13/103,485 either in full, in part, or as a superset (i.e. extending the teaching to residential real estate, etc.) as desired.

Here during any part of the tour process as desired, the user can also evaluate this site (here shown as Comp 2) (310) and as desired adjust the various KSD ratings (312) using software parameter adjusting sliders or other mechanisms (314). Here the user is adjusting the "layout" KSD rating for this particular site. The overall KSR rating of the site (i.e. the value of the Key Site Rating function composed of the various individual KSD variables) is shown as (316). Here, information about this particular "comp" site, as previously discussed in parent application Ser. No. 13/103,485, incorporated herein by reference (see for example FIG. 14A) can also incorporate other information such as photos of the site (318), building information (320), and other information such as the user's notes (322). Additionally, the system may also allow the user to use the device's video camera to take site photos (e.g. by pressing icon 324) or take audio notes (e.g. by pressing icon 326) and store these in site related image, video, or audio files (328) for later playback. In FIG. 3, the user has stored one such file (328), perhaps from a previous visit to this site.

Returning to the KSD evaluation embodiments of the invention—as previously discussed, it is useful to consider the various KSD functions and data types disclosed herein, when used, as being a superset of the KSD functions and data types previously discussed in parent application Ser. No. 13/103,485, incorporated herein by reference. Indeed, these KSD functions may also be extended to a greater variety of real estate types (e.g. residential property as well as commercial property) and transaction types (e.g. management and sales as well as leasing).

Although the KSD module is not required for all embodiments of the invention, in some embodiments, the other methods or software modules (e.g. itinerary functionality, appointment functionality, floor plan functionality, augmented reality functionality, etc.) described herein may further be supplemented by a KSD evaluation module.

In the KSD evaluation module, generally at least one reference or ideal property (330) and at least one comp real estate property (e.g. 310) will be assigned, on an individual basis, a plurality of Key Site Driver (KSD) numeric descriptors (312) describing the various characteristics of the property (criteria). As discussed in more detail in parent application Ser. No. 13/103,485 these various sites can be presented in a dashboard format or overview that displays comparative information from all sites at once (e.g. Ser. No. 13/103,485 FIG. 14D 1406, 1408, 1410, 1412). This type of overview information can be presented in the "all" tab (332).

Thus in the KSD evaluation module, the personal or mobile computerized device will allow the user to define a plurality of different KSD variables for one or more reference or ideal properties. Here, for example, the system will allow the broker or client to define the relative importance coefficients for multiple individual KSD variables. The system will also allow the broker or client to define or create a KSD function that produces a property specific KSD number (or KSR number using the alternative nomenclature) that can be used to describe both the reference or ideal property, and the various comparison (comp) real estate properties. Here, although other possibilities can be done, it is useful to set this function so that generally the sum of all of the relative importance coefficients in these multiple KSD variables is equal to 100% or 1.

Financial considerations are often a very important KSD variable. In some embodiments, the basic method and system will allow a particular property of interest, such as an existing lease, existing owned property, or other reference property of interest (here simply termed an "existing lease for brevity to be evaluated, relative to at least one set of comparable potential other properties or leases (Comp[s]). Here, for example, a portfolio containing at least one existing lease on a leased property (each with its particular location, lease or ownership start date, optional lease expiration date, rent or mortgage payments as function of time, and projected other property expenses as a function of time, each having its own associated set of comps) can be evaluated. Here, for example, this evaluation can be done by projecting future expenses (on an individual property basis) this at least reference property by performing a numeric integration over time from (again as an example) the present time to the reference property lease expiration date. The equation to be integrated can be the sum of the reference property rent (as a function of time) and projected other leased property expenses (as a function of time). This integration will generally produce the projected total cost of the reference property.

This process can be done for each individual comp property as well. Here again, the data can be obtained describing the same type of details for the comp, and the projected total costs of each comp can be further performed by doing the same type of numeric integration.

In addition to the financial data, the reference property and "hits" comps will also have a variety of other KSD parameters. Here, these various KSD parameters, which may, for example, be referenced to an ideal property (which may or may not exist). Here the relative importance coefficients of both the financial projection KSD parameters and the other KSD parameters can be determined or defined in a manner that creates a KSD function that in turn produces a KSD number (KSR value) that describes the various properties. As previously discussed, generally all of these relative importance coefficients should sum up to a value of 100% or 1. This KSD function can then be used to rank all of the various properties on a per-property basis. This KSD function, when applied to the various property KSD numbers, will thus produce an overall suitability ranking or comparison (KSR number), which can then be displayed (e.g. FIG. 3, 316), along with other data as desired, on the computerized device.

In a commercial context, examples of other types of KSD variables include aesthetics, floor layout, signage, gyms, auditoriums, proximity to daycare, proximity to airports, rail depots, or interstate highways, proximity to restaurants, commuting time to key locations, and ease of expansion. In a residential context, other factors such as proximity to schools and parks, neighborhood crime statistics, neighborhood socioeconomic scale and the like may also be used.

Thus when the KSD functionality is used, the system will generally also allow the broker or client to assign values to at least some of these various KSD variables and use the KSD function to create at least one KSD number (KSR value) that describes the reference or ideal property of interest or comp real estate property of interest. Often, it will be useful to further transmit these KSD variables to a recipient (often the broker's server or computer) using the device's wireless transceiver. In FIG. 3, this option is shown as a menu option (334). Indeed, all of the data in the invention may be transmitted or received as desired.

For KSD evaluation purposes, all else being equal, it is often preferable to physically visit the real estate site, as this can lead to more accurate KSD information. Further, by being physically at the site, either the broker or client may notice additional factors of interest that were not previously used as KSD criteria, but perhaps should be. For example, if a property has some previously undocumented desirable or undesirable feature, such things can be noted and used to further improve the utility of the KSD comparison method.

Figure 4:
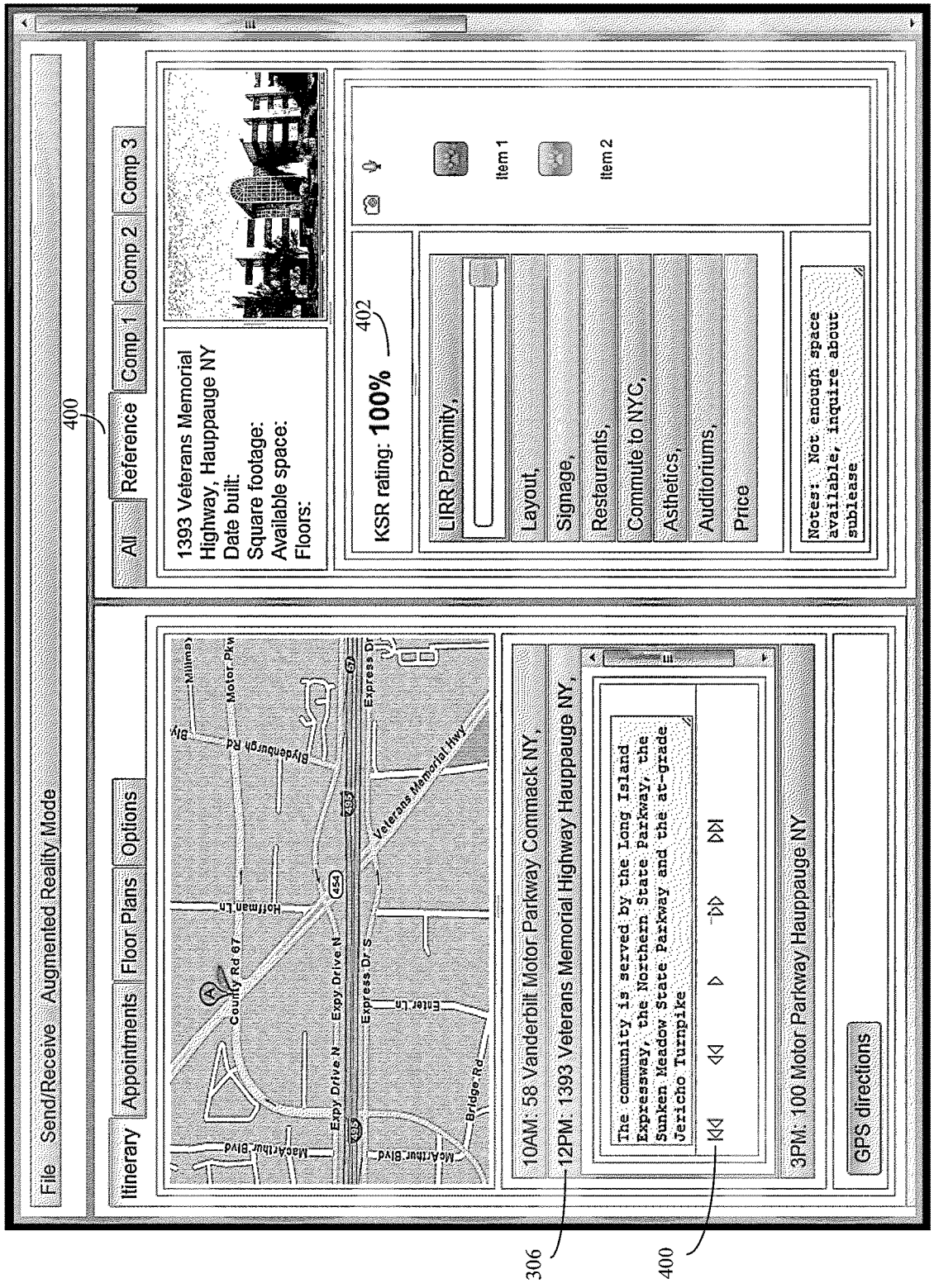
FIG. 4 shows another screenshot, again showing the invention's itinerary module in operation. Here the client is reviewing details of the second property on this days tour, and additionally may be playing back audio broker commentary regarding this second property. The client can also review and even rate this second property during this time (or other properties) as desired.

FIG. 4 shows another screenshot, again showing the invention's itinerary module in operation. Here the client is reviewing details of the second property on this day's tour (306), and additionally may be playing back audio broker commentary regarding this second property (400). The client can also review and even rate this second property during this time (or other properties) as desired. In this example, this second property (the 12:00 pm appointment at 1393 Veterans Memorial Highway) is so desirable that it is being used as the "ideal" or "reference" property for KSD evaluation purposes. Note that this property has a perfect (100%) KSR (overall KSD numeric function) rating (402).

If the user is following an itinerary and desires to make itinerary changes, in some embodiments the device can be further programmed or configured to then automatically transmit a message to the impacted broker(s) or manager(s) informing them about the changes. Thus, for example, if the tour is running an hour late for a visit for a particular party, a simple touch on the device GUI direct the device to inform the properties' broker or manager of the delay, thus improving tour efficiency and interpersonal goodwill. This notification can be, for example, by SMS message, email message, or even automatic schedule change on the broker's or manager's automated appointment calendar.

Alternatively, even if the user is not following a pre-set itinerary, the system can be configured so that when the owner, manager, or broker contact information is available (e.g. an owner or manager or broker email or telephone number), the system can provide this to the user as an active user interface (e.g. "click" or voice activated) link, allowing the user to make immediate contact with the owner, manager, or broker of a property of interest. In some embodiments, the contact information can be provided as a geo-reference so that when the user reaches the particular coordinates of the geo-reference, this owner, manager, broker or other real estate agent contact information will be automatically provided by the system.

In one embodiment, as the actual tour progresses, the system can additionally log the visits by the real estate broker or agent and/or the end-user client to the various sites or comps. Although optional, this automatic visit logging feature would be highly useful to the managers and owners of properties, because it would let them know the activity level of showings, who may be interested in their sites and if their property broker was in attendance.

Additionally, since brokers are often financially supported by commissions from the real estate transactions that they have facilitated, such a feature would be useful because it would help brokers prove that they introduced a particular client to a particular real estate location.

The system may thus, for example, send this visit information automatically to the property manager and owner, while further sending a copy back to the broker's computer who is doing the tour. Additionally, the client themselves may also have a report automatically emailed back to them of what comps they visited, plus their own now refined KSD scores of each, plus notes in the form of text, audio, photos and video.

Figure 5:
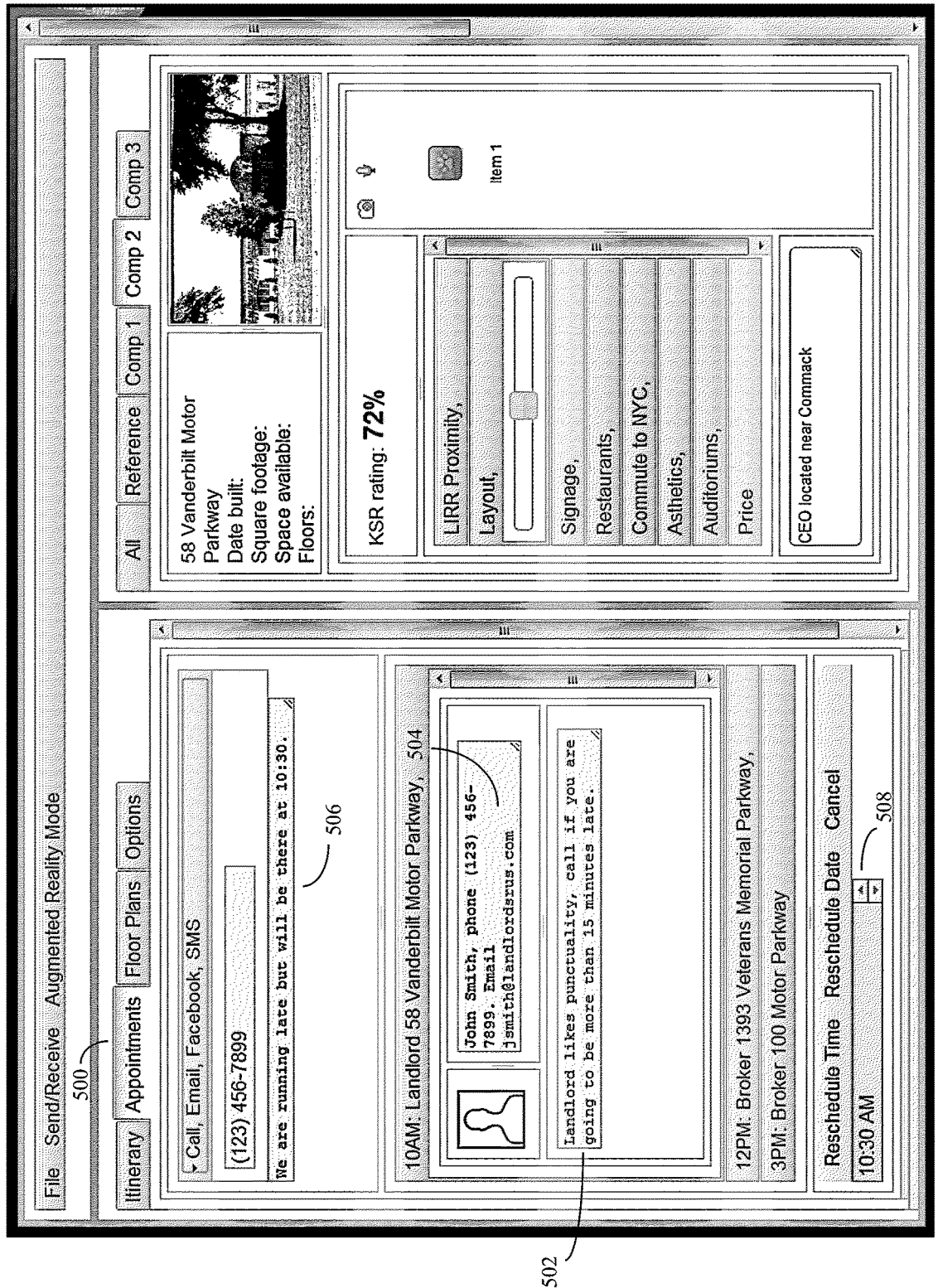
FIG. 5 shows a screenshot showing the invention's appointments module in operation. In this example, the user (client or broker) is running late for the first appointment. The appointments module can notify the client that the landlord for this first property likes punctual visitors, and also gives the landlord's contact information via various communications channels. Here the user is using the invention to send an SMS message to this landlord informing him of the schedule delay. The client may additionally reschedule the time electronically.

FIG. 5 shows a screenshot showing the invention's appointments module in operation. This is shown by tab (500). In this example, the user (client or broker) is running late for the first appointment. The appointments module can notify the client that the landlord for this first property likes punctual visitors (502), and also gives the landlord's contact information via various communications channels (504). Here the user is using the invention to send an SMS message to this landlord informing him of the schedule delay (506). The client may additionally reschedule the time electronically (508).

Floorview (Floor Plan) Modules:

As previously discussed, both commercial and residential real estate often consist of buildings with multiple floors or levels. In order to improve broker and client or other user convenience during tours of such sites, in some embodiments, the device software will direct the device to automatically bring up floor plans and other floor related information for the correct floor when the device user reaches this correct floor, or when the device user points at this particular floor (as will be discussed shortly in more detail in FIGS. 12 and 13). This helps the device provide the correct data to the client (or broker) at the instant that it becomes most relevant. Alternatively, the users may also bring up the relevant data by manually requesting the data.

There are various ways to implement this automatic data presentation functionality. In some embodiments, the invention's methods may trigger presentation of floor plans or other data when the device detects that the user has changed altitude, while at the building site location. Altitude changes may be detected by multiple methods and by multiple sensors. One simple way to detect altitude changes is to simply use the device's GPS sensor to detect changes in altitude. Alternatively, the device may integrate movement from the device's accelerometers and motion sensors, and compute altitude changes that way. As yet another alternative, the device may triangulate its position relative to various local wireless transmitters, such as various cellular, WiFi, or Bluetooth™ transmitters, and compute altitude changes by this manner. For example, the device could determine the user's location within a building structure by using a WiFi-location table or database that lists the building's (or other local) site unique WiFi base station names, and optionally also their relative signal strength. Here, a building owner could either identify the location of the various WiFi base stations by explicit WiFi location names (e.g. "$5^{th}$ floor—100 Main St. WiFi"), or by a less explicit WiFi name, and then make the name-location information available to the WiFi-location table database.

As yet another alternative, the computerized device may incorporate sound recognition technology, and identify locations by explicit speech interpretation or by monitoring the acoustic properties of the environment. Indeed, the device may even use an air pressure type altimeter for detecting altitude changes.

Recently announced real-time navigation chips, exemplified by the Broadcom 4752 Integrated Multi-Constellation GNSS Receiver chip, which utilizes signals from GPS satellites, cell-phone towers, Wi-Fi hotspots, gyroscopes, accelerometers, step counters, and altimeters may be useful in this regard.

Regardless of the method used to detect change in altitude, once the personal or mobile device detects the altitude change, its software can then retrieve the real estate property information pertaining to the floor plan for a the story or level that the device is now on, and display this floor plan on the device's display screen (GUI). Alternatively, users may also choose to manually select this information by appropriate GUI selections as well. This allows them to view the floor plan in advance, but then have the floor plan also instantly re-presented when it is most important. Typically the software will be configured so that this automatic floor plan feature can be turned on and off according to user preference.

Alternatively, the user may select display of the particular floor plan of interest manually, here for example by pressing the appropriate floor level tab.

Figure 6:
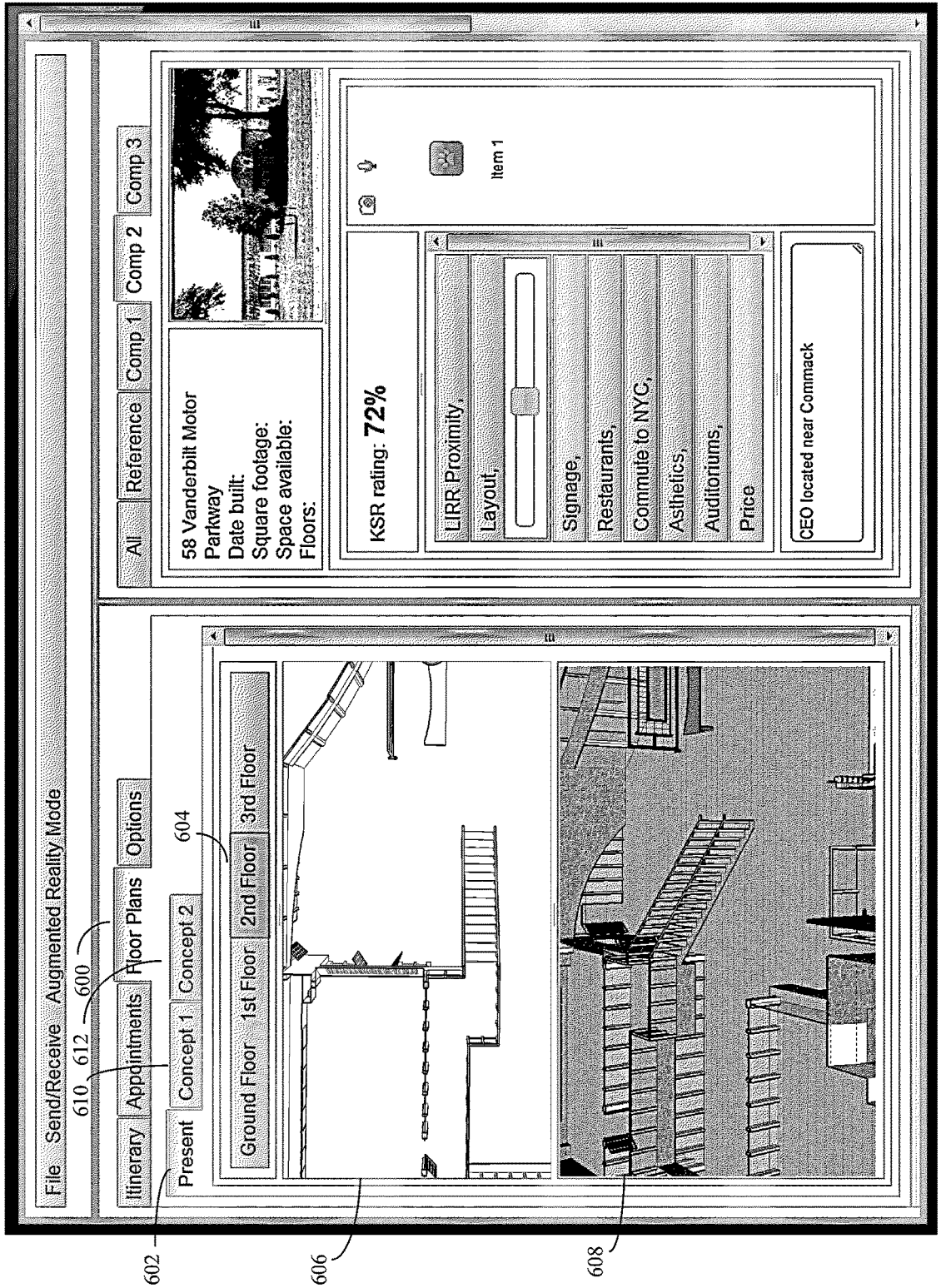
FIG. 6 shows the invention's floor plan module in operation. Here the present floor plan for the second floor of the first site visited is being displayed. The system also enables the user to see some alternate concept diagrams of how this floor plan can be modified to fit the client's needs.

FIG. 6 tab (600) shows one embodiment of the invention's floor plan module in operation. Here the present floor plan (602) for the second floor (604) of the first site visited is being displayed (606), (608). The system also enables the user to see some alternate concept diagrams of how this floor plan could be modified to fit the client's needs (610), (612). To facilitate viewing of detailed floor plans, in some embodiments, this module may be configured to zoom (expand) in size to fill more or even the entire display screen as desired.

Augmented Reality Functionality

In some embodiments, it may be useful to further enhance the system with various augmented reality or virtual reality software modules. Such modules could either display an overlaid image of what the user sees through the "camera view" of the Tablet computer or Smart Phone device, so that the underlying image is still there, but overlaid with new information, or it could completely replace what is displayed on the personal or mobile device's screen with such new information. Alternatively, the augmented reality data can be displayed on an augmented reality headset or glasses device, so that the user can continue to view some aspects of the scene directly while receiving augmented reality information overlaid on other portions of the scene.

In one embodiment, images or CAD drawing information pertaining to possible future configurations (i.e. remodeling changes, decorating changes, painting changes, sign changes, fixture changes, furniture changes, landscaping changes, etc.) of this reference or ideal or comp real estate property can be loaded into the device. For example, if a client wishes to partition the building floor plan differently, the owner or broker of a property of interest may commission an architect or CAD designer to produce at least informal CAD drawings showing these proposed modifications. The personal or mobile computerized device can be programmed to take these drawings and information, and use its GPS sensors, location and orientation sensors, or video camera obtained position data to determine the device's current position and orientation. The device can then position and orientation adjust these images or CAD drawings, and then display them on the device user interface. Thus for example if the user is holding the device in a particular position, orientation, and angle, or wearing an augmented reality headset in a particular position, orientation, and angle, the system can also compute what the modification would look like from that particular position, orientation, and angle, and let the user see what the future configuration of the property would then look like from that viewpoint. The user can then directly compare these proposed modifications with the user's present real-world view of the property.

Indeed in some embodiments, when the computerized device has a video camera, this video camera can be configured to obtain video of at least a portion of the device's surroundings. The system can then be configured to provide video images of the present appearance of the reference or ideal or "comp" real estate property from this viewpoint. Then, optionally with position and orientation data further refined by the video data, the device can simultaneously show both the location and orientation adjusted images or CAD drawings of the possible future property improvements (configuration), and as images video images of the present appearance of the property, on the same display screen (GUI) and at the same time.

Figure 7:
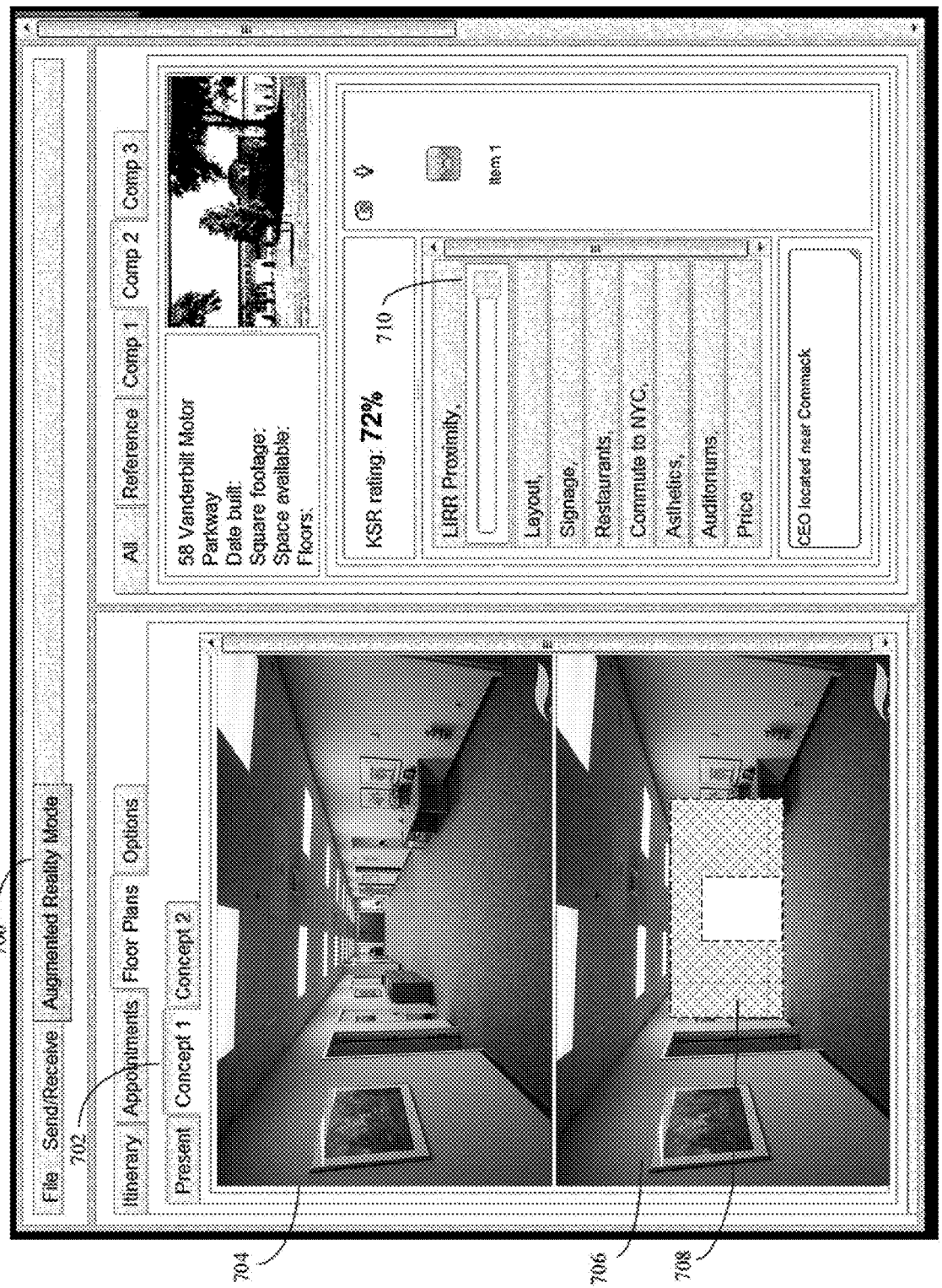
FIG. 7 shows the invention's floor plan module in augmented reality mode. Here a user can inform the system to use the device's camera to photograph the current surroundings, and supplement this photograph with proposed floor plan alteration data, thus allowing the user to better visualized proposed floor plan changes.

In some embodiments, it may be useful to show these simultaneous location and orientation adjusted images or CAD drawings pertaining as overlays with the device's video images of the present appearance of the property. This can be, for example as a semi-transparent overlay, augmented reality display overlay, and the like FIG. 7 shows the invention's floor plan module in augmented reality mode. In some embodiments, a user can inform the system to use the device's camera to photograph the current surroundings, and supplement this photograph with proposed floor plan alteration data, thus allowing the user to better visualized proposed floor plan changes. In this example, augmented reality mode is being invoked using an augmented reality mode menu setting (700), and is being used to show a first concept of modifying this building interior (702).

In other embodiments, such as when a see-through augmented reality headset is being used, the system can use the user's position to display the proposed floor plan changes as an overlay to the user's present see-through view of the floor.

In FIG. 7, the system (here based on a tablet computer) is showing a presently photographed or video image of an outdated building interior (704), here augmented with a proposed alteration to this outdated interior (706) and the specific modification (here a new wall with a doorway) (708).

Note that in some embodiments, while these various floor plan review processes are continuing, if desired, the user can continually adjust the various KSD values (710), changing them from their earlier settings (compare the FIG. 7 slider setting to the same slider setting on FIG. 6) as the user forms new opinions about the site.

Figure 8:
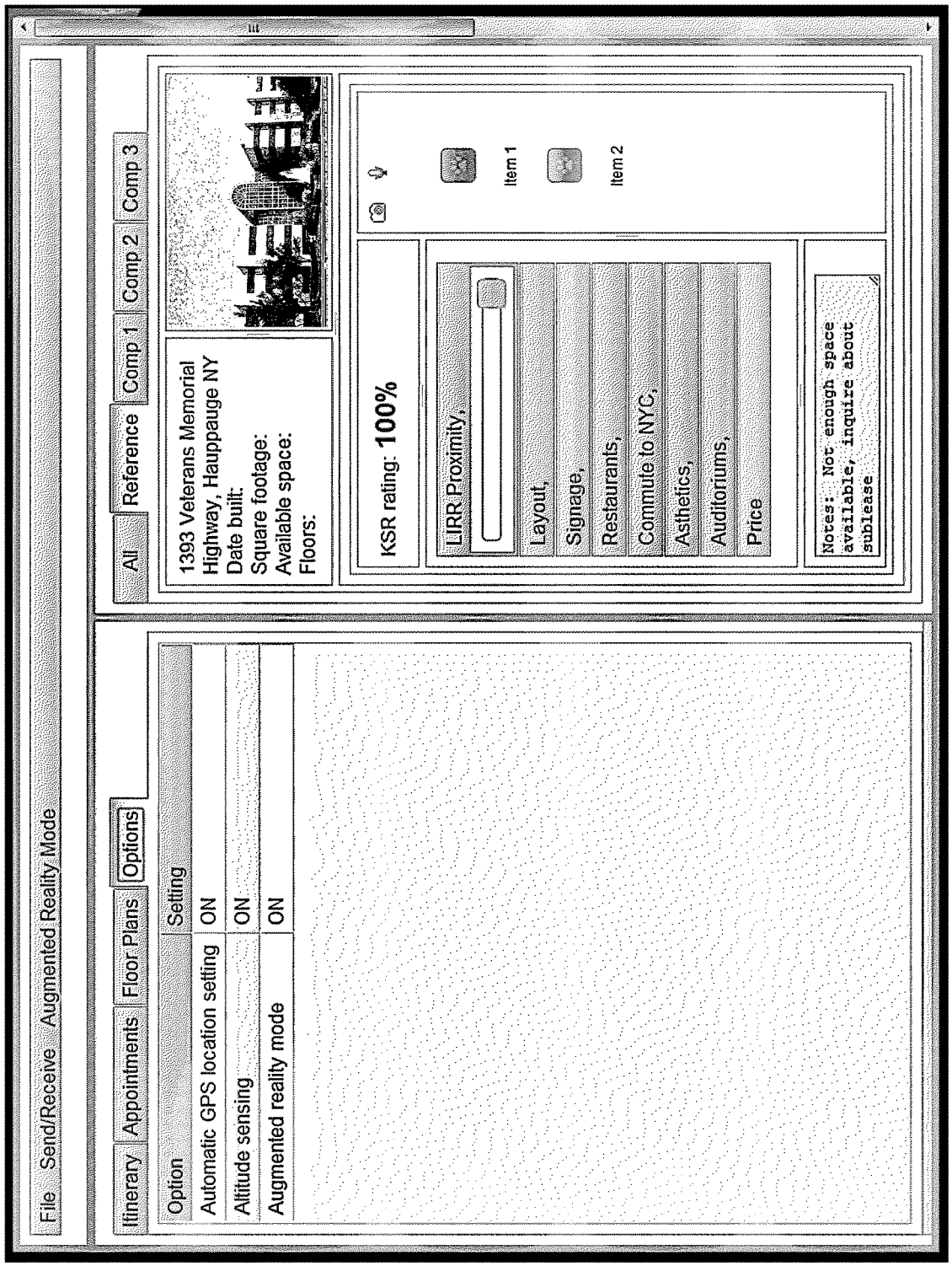
FIG. 8 shows some of the invention's various parameter settings.

FIG. 8 shows an example of some of the invention's various parameter settings. In this example, the user has told the system to automatically bring up the various site information using GPS information as the user approaches the site, and to also bring up the appropriate floor plans using altitude information. The user has also told the system that the user will want to invoke augmented reality mode, which can cause the system to reserve computational capability and files as needed as augmented reality methods can be computationally intensive.

Figure 9:
FIG. 9 shows the invention, operating in the form of tablet computer software, being used by clients during a building walkthrough.

FIG. 9 shows the invention, operating in the form of tablet computer software, being used by clients during a building walkthrough. Here the invention is showing a floor plan, the user's current location, and various real estate and financial information pertaining to this particular building.

Figure 10:
FIG. 10 shows the invention, here operating in the form of smartphone or handheld tablet software, being used in conjunction with wireless technology or optical recognition technology to open an electronically locked door. Here, for example, a remote broker may transmit suitable authorization codes to a client (user) device providing suitable unlock codes (e.g. for remotely unlocking the property).

FIG. 10 shows the invention, here operating in the form of smartphone or handheld tablet software, being used in conjunction with wireless technology or optical recognition technology to open an electronically locked door. In other embodiments, these methods may also be used to log in when the building was toured by a broker or client, or other purposes. For example, as will be discussed in FIG. 11B, in some embodiments a remotely located broker or other property representatives can transmit suitable authorization or unlock codes to a user personal mobile computerized device, thus enabling a user to visit an otherwise locked property or portion of the property. This can be used to remotely unlock the property.

Thus in this embodiment, the tour real estate property information can further comprise electronic lock information enabling the personal mobile computerized device to unlock at least one electronic lock on the property. This can be done, for example, by providing information to the device processor directing the device to provide (e.g. transmit) unlock information to the electronic lock. This can be done, for example, by providing a suitable optical, magnetic, near-field RFID, RFID, or wireless connection with the at least one electronic lock.

Additionally, these local identification methods can be used to, for example, trigger electronic chat sessions with the broker or property management. Thus for example, when the device senses that it is in a location previously designated by the broker or property owner/manager as being interesting, the system can either bring up video or sound of the broker, or alert the broker (e.g. via SMS message, email, telephone, etc.) or manager/owner that a potential customer is in the region of interest, and even optionally establish a communications session between the customer and broker or owner/manager as desired. This essentially can create "virtual broker" type functionality.

Further Personal or Mobile Computerized Device Discussion

Although the methods described herein can work with more limited capability personal or mobile computerized devices, in a preferred embodiment, higher capability personal or mobile computerized devices, exemplified by the popular Apple iPad 3 and iPhone 4, with high-resolution screens, memory in excess of 1 Gigabyte (often 8, 16, 32, 64 or more Gigabytes), may be used, as well as the previously discussed augmented reality headsets (e.g. Google Glass, Microsoft HoloLens, etc.)

Because such higher capacity computerized devices have relatively large amounts of internal memory, if desired, such as in the context of a tour with an itinerary, some or all the necessary data, photos, floor plans, audio, video, 3D CAD drawings, and the like can easily be stored onboard the device prior to any tour, and thus the need for making instant and reliable wireless connections with the Internet immediately after entering into a new building for the first time can be reduced. Similarly, data obtained during the tour—e.g. entered KSD parameters, audio notes, image or video data and/or notes, and the like may be stored onboard the computerized device, and then only uploaded to another user or server when it is convenient. Thus although the present methods may utilize wireless connections to, for example, remote Internet servers for the purpose of data interchange when it is convenient, such wireless connections are optional and may be dispensed with when it is not convenient.

Put alternatively, the system will be able to take full advantage of any personal or mobile wireless connections as they continue to develop, but as stated above, need not be fully dependent on them.

Figure 11A:
FIG. 11A illustrates how the invention's software can allow the client to tour the building, while the broker or property owner/manager can conduct remote virtual tours. Alternatively or additionally, the client, using the invention, can video tour the building (Comp) remotely, with or without the broker providing them with a real-time tour of the facility. Here the broker can walk the space and use the invention to provide the remote client with real-time video tours.

FIG. 11A illustrates how in some embodiments, the invention's software can allow a client to tour the building, while the broker or property owner/manager can conduct remote virtual tours, and discuss certain features of the building while the client is physically at or near the building.

Figure 11B:
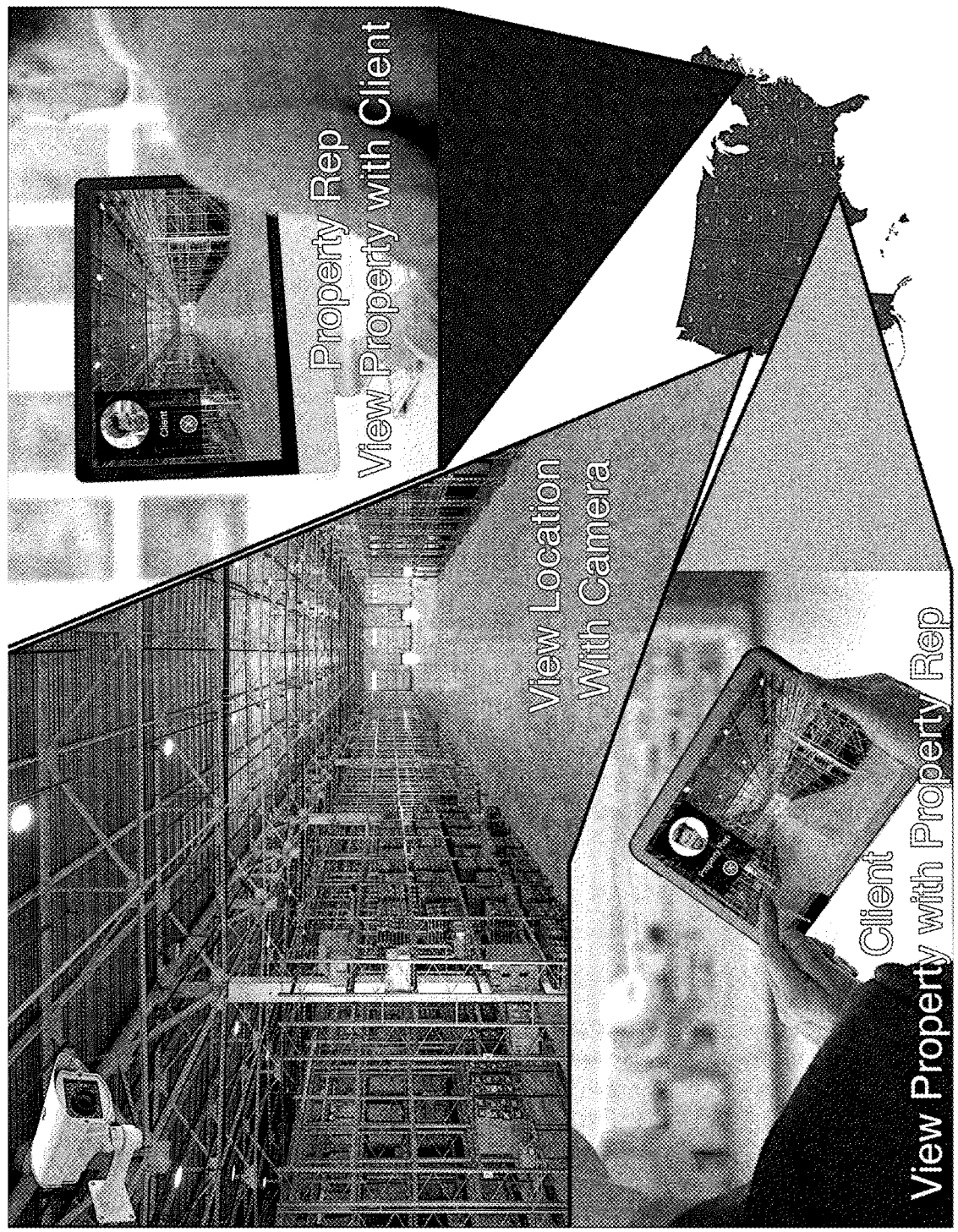
FIG. 11B shows the invention being used in a commercial property setting, where the user is a client, and the broker or property owner/manager is termed the property representative. In some embodiments, both the client and the property representative may be physically present at the property (touring the property), or the client may be touring and the property representative may be remote from the property, or the client may be remote and the property representative may be touring the property, or both the client and the property representative may be remote from the property.

FIG. 11B shows the invention being used in a commercial property setting, where the user is a client, and the broker or property owner/manager is termed the property representative. In some embodiments, both the client (user) and the property representative may be physically present at the property (touring the property), or the client may be touring and the property representative may be remote from the property, or the client may be remote and the property representative may be touring the property, or both the client and the property representative may be remote from the property. Note that, for example, when the client is touring the property and the property representative is remote, the remote property representative can "buzz the client in" by providing the electronic codes to activate a electronic key, as previously shown in FIG. 10.

Figure 11C:
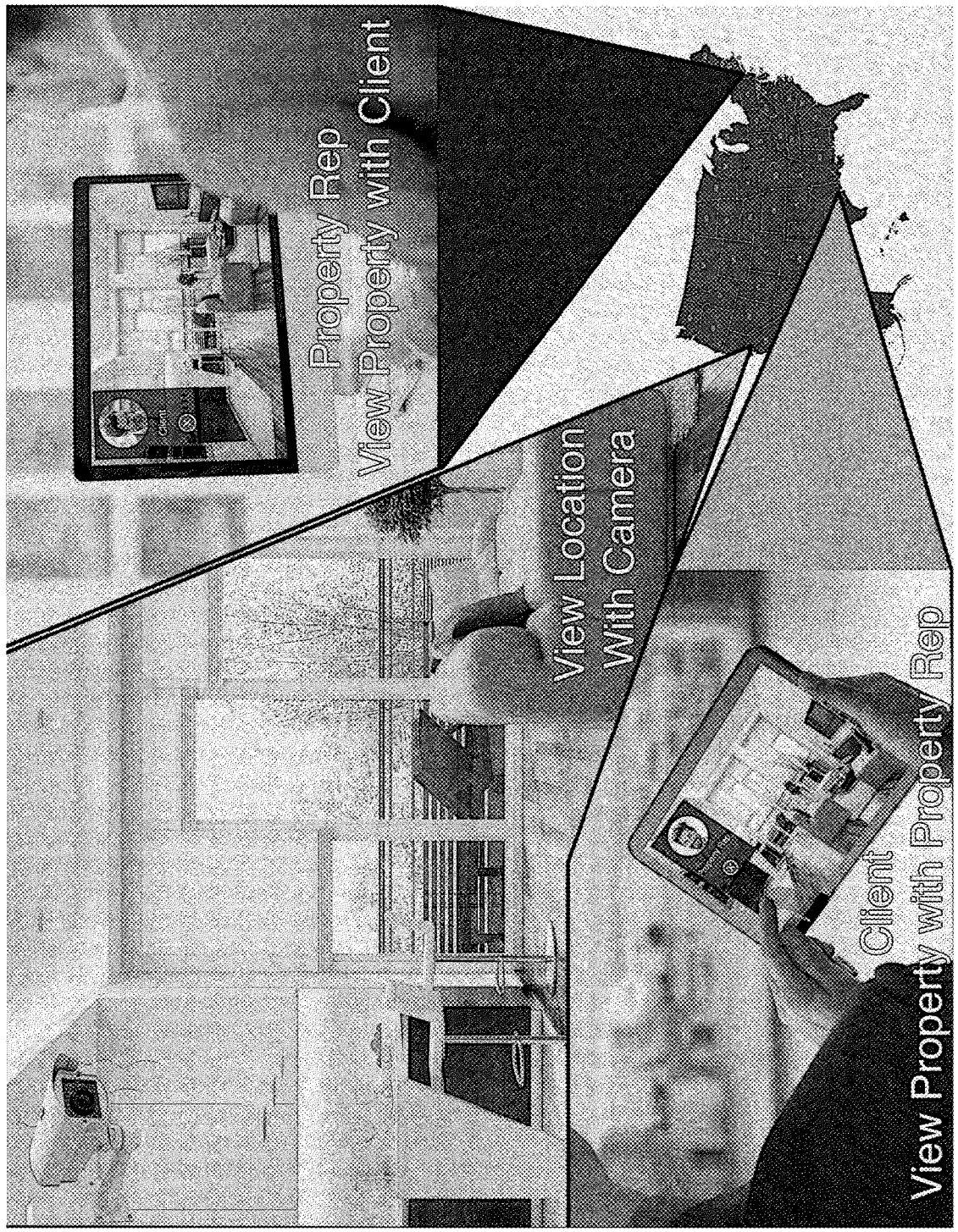
FIG. 11C shows the invention being used in a residential property setting. As before, in some embodiments, both the client and the property representative may be physically present at the property (touring the property), or the client may be touring and the property representative may be remote from the property, or the client may be remote and the property representative may be touring the property, or both the client and the property representative may be remote from the property.

FIG. 11C shows the invention being used in a residential property setting. As before, in some embodiments, both the client and the property representative may be physically present at the property (touring the property), or the client may be touring and the property representative may be remote from the property, or the client may be remote and the property representative may be touring the property, or both the client and the property representative may be remote from the property.

Figure 12:
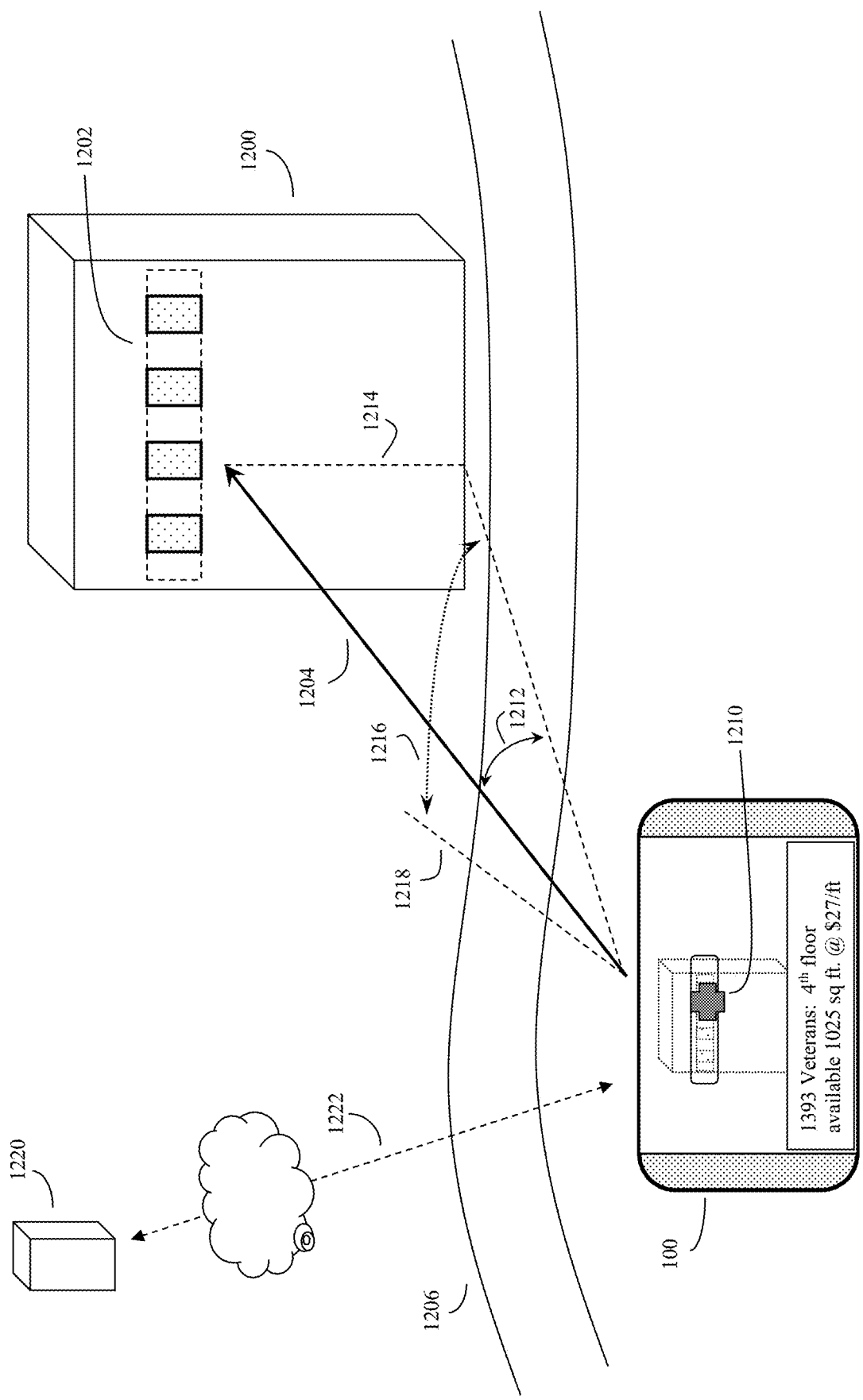
FIG. 12 shows how the invention, here implemented on a smartphone or tablet type personal/mobile computerized device, can be used to point to a property of interest, and retrieve information pertaining to that property, such as what floors are available for lease, amount of space available on that floor, and price per square foot.

FIG. 12 shows how the invention, here implemented on a smartphone or tablet type personal/mobile computerized device (100), can be used to point to a property of interest (1200), and retrieve information pertaining to that property, such as what floors (1202) are available for lease, amount of space available on that floor, and price per square foot.

In this drawing, the user is using the personal computerized device (100) to define a pointing vector (1204) between the physical (e.g. geographical) position of the personal computerized device (100) and at least a portion (1202) of a tour (e.g. real world) real estate property of interest (1200). In this example, the real estate property is a multi-story building, and the user is standing on the opposite side of the street (1206) within visual proximity of the building (1202).

Various techniques can be used to define this pointing vector (pointing direction). In this example, the personal computerized device (100) has a processor (104) that can use any combination of orientation sensors (110, 112) or video cameras (116) to define the pointing vector (1204). In this discussion, the origin of the pointing vector (100) can be defined by GPS receiver (114), and it can be the same as the location of the personal mobile computerized device (100).

In some embodiments, the device's video camera (see FIG. 1, 116) can be used to help define the pointing vector. Here the user may simply point the video camera at the building or other location of interest (1200, 1202), and, for example, designate the building (1200) or portion of the building (such as a particular) floor level with a cursor (1210) that the device's processor (104) outputs onto the device's display (102) to designate the pointing direction of video camera (116). The device processor (104) can then use computer image recognition techniques to analyze the image, and depending upon the option chosen by the user, designate either the entire building (1200) or a specific portion of the building (e.g. the $4^{th}$ floor of the building 1202) as being of interest.

Alternatively or additionally, the device (100) and more specifically the device processor (104) may use the device's orientation sensors (112) (e.g. magnetic sensors to determine an azimuth (1216) of the device relative to the Earth's magnetic field (1218), and accelerometers (110) to define the altitude or elevation angle of the device (1212) relative to the Earth's direction of gravity (1214). Here the accelerometer (110) may be considered to be a specific type of orientation sensor (112).

This information—the origin of the pointing vector (which may be automatically provided by the device's GPS sensor, or by other method, and is the same as the location of device 100) and the pointing vector (pointing direction 1204) defined by any combination of video camera data and orientation sensor data, when combined with 3D map information (e.g. map information showing the location and altitudes of various buildings or other features in the vicinity of the user), can thus be used by either the device processor (104) or a remote server to unambiguously determine exactly what the user (and device 100) is pointing at. This pointing information, in turn, can be used to retrieve information pertaining to the pointed to building, portion of building, or other object. Specifically, this information can be retrieved from either the device's local memory (106) or from a remote server (1220) via a wireless (e.g. cellular, WiFi, or other) type connection (1222).

Although smartphones and tablet computers presently far outnumber augmented reality headsets (e.g. Microsoft HoloLens type devices) and augmented reality glasses (e.g. Google Glass type devices), use of such augmented reality headsets and glasses is not disclaimed, and indeed some or all of the methods of the present invention may be implemented using such augmented reality headsets and glasses. An example of this type of implementation is shown in FIG. 13.

FIG. 13 shows how the invention, here implemented on an augmented reality headset type personal mobile computerized device (1300), can allow the user to view the outside world while, at the same time, displaying at least some information pertaining to the real estate property of interest as an augmented reality overlay (1302) on the augmented reality headset's display (1304). In some embodiments, the headset may also have video cameras (1306), as well as various types of orientation or pointing type sensors.

In FIG. 13, the augmented reality headset (1300) is drawn as a simplified version of a Google Glass type device. In this configuration, the device's electronics may be configured in the earpieces (1308) or elsewhere. For simplicity, any folded optics, prisms, semi-reflecting mirrors, or rental projection devices used to implement the see-through augmented reality display (1304) have been omitted. Here, as in Google glass, only one lens or see-through mirror of the augmented reality headset has a display (1304), but in other embodiments, the augmented reality display or displays may be configured so that the user can view the augmented reality overlay (1302) through both eyes. Otherwise, the methods used for the augmented reality headset may be the same as previously described in FIG. 12.

Thus, for example, according to either FIG. 12 or FIG. 13, according to the invention, the device can be configured to enable the user to position the personal mobile computerized device (100, 1300) within a suitable proximity of the tour real estate property (1200) so as to point with a device pointing direction (1204) towards at least a portion of the tour real estate property (e.g. any of 1200 or 1202). According to the invention, the device can use any of the position determining devices (110, 112) and at least one mobile computerized device video camera (116), to automatically, using its at least one processor (104), determine an identity (e.g. mark or designate) the at least a portion of the tour real estate property (e.g. any of 1200 and 1202). According to the invention, the device can then use this identity (or mark or designation) of this at least a portion (any of 1200 or 1220) of the tour real estate property (1200) to further load (or retrieve or access) data comprising information pertaining to the property information of this at least a portion of the tour real estate property (1200, 1202) into the device's memory (106).

In some embodiments, the above techniques may be implemented by using any of the position determining devices (110, 112) and at least one mobile computerized device video camera (116), to automatically, using the at least one processor (104), determine an identity (or mark or designate) at least a portion (e.g. 1200, 1202) of the tour real estate property. This can be done in various ways.

As one example, the device (100, 1300) can use the orientation sensors (110, 112) to determine any of a device altitude angle (1212) and azimuth angle (1216) of the device's pointing direction (e.g. pointing vector 1204). The invention can use the at least one processor (104) to determine an offset location (here the magnitude and direction of the pointing vector 1204) of the at least a portion of the tour real estate property (1202), relative to a device location of the personal mobile computerized device (100, 1300). The invention can then use both this offset (1204) and the device location (100) to determine the identity (or mark or designate) of this at least a portion of the tour real estate property (1200, 1202 depending on the specific request). The device (100, 1300) can then either work with remote servers (1220) via a wireless connection (1222) or with 3D map data previously stored in memory (106) to determine what the user is pointing at.

Alternatively or additionally, according to the invention, the user can use the at least one mobile computerized device video camera (116, 1306) to automatically, using the at least one processor (104), use computer image recognition algorithms to recognize an appearance of at least a portion of the tour real estate property (e.g. 1200 or 1202), and correlate the appearance of this at least a portion of the tour real estate property with an identity (or mark or other designation) of this at least a portion of the tour real estate property. This again can be used to retrieve additional information about this identified or marked or designated real estate property or portion of the real estate property.

Note that in some embodiments, the user may just wish to acquire augmented reality information about tour properties without using the invention's KSD functions, or being burdened with issues of reference properties and comp properties.

In these no KSD embodiments, the invention may be viewed in the alternative as being a computerized method of conducting real estate real-world tours using a personal mobile computerized device. As before, this device will typically comprise at least one processor, memory, a graphical user interface, at least one wireless transceiver, and at least one location determining device, However here, the device may be configured to simply provide tour information by using its at least one processor to load computer readable tour real estate property and positions of this tour real estate property into the device's memory in a manner that the personal mobile computerized device retains tour real estate property information on at least one of a stand-alone basis and as part of a wireless networked system with external servers. The device can then use the processor and the at least one location determining device to display at least some information pertaining to the tour real estate property on the user interface according to a location of the personal mobile computerized device during a real estate real-world tour.

Note that the property information can comprise many different types of information. For example, the property information can comprise any of rent, building size, available space for lease, property broker name, property broker contact information, landlord name, landlord website, descriptions describing the real estate properties, descriptions describing characteristics of regions surrounding the real estate property, and other types of descriptions describing characteristics of the real estate property.

Note that the methods herein may also make use of the various concepts further disclosed in provisional application 61/794,372 entitled "Reoptimizer Walkthrough", inventor Donald Charles Catalano, filed Mar. 15, 2013; the contents of which are incorporated herein by reference.

The invention claimed is:

1. A computerized system for conducting real estate real-world tours, said system comprising:
    a personal mobile computerized device comprising at least one processor, memory, a graphical user interface, and at least one wireless transceiver, and at least one location determining device;
    said at least one processor configured to load computer readable reference real estate property information pertaining to a real estate user's reference real estate property and positions of said reference real estate property into said memory in a manner that said personal mobile computerized device retains said reference real estate property information on at least one of a stand-alone basis and as part of a wireless networked system with external servers;

said at least one processor further configured to load computer readable comp real estate property information pertaining to a plurality of comp real estate property and positions of said plurality of comp real estate property into memory in a manner that allows said personal mobile computerized device to retain said comp real estate property information on at least one of a stand-alone basis and as part of a wireless networked system with external servers;

said at least one processor configured to use tour real estate property comprising at least one of said reference real estate property and said a plurality of comp real estate property, and said at least one location determining device to display at least some information pertaining to said tour real estate property on said user interface according to a location of said personal mobile computerized device during said real estate real-world tour;

said at least one processor further configured to receive user input from said user interface to define real estate user customized comparable data comprising property specific values comprising at least one of numbers and images that describe said tour real estate properties, thus automatically evaluating on said at least one processor, according to said user input, multiple tour real estate properties.

2. The system of claim 1, wherein said personal mobile computerized device additionally comprises position determining devices comprising at least a GPS receiver, an orientation sensor, and an accelerometer;

said at least one processor further configured to load data comprising information pertaining to property information of at least a portion of said tour real estate property into said memory;

said at least one processor further configured to use said position determining devices to automatically, using said at least one processor, determine a location and orientation of said personal mobile computerized device; and, said at least one processor further configured to display on said user interface, during a real-world tour of said property, location and orientation adjusted data, pertaining to any of at least a portion of said property information and said tour real estate property.

3. The system of claim 2, wherein said at least one processor is further configured to use any of said position determining devices and at least one mobile computerized device video camera, to automatically determine an identity of said at least a portion of said tour real estate property when a user positions said personal mobile computerized device within a suitable proximity of said tour real estate property so as to point with a device pointing direction towards at least a portion of said tour real estate property; and said at least one processor further configured to use said identity of said at least a portion of said tour real estate property to further load said data comprising information pertaining to property information of at least a portion of said tour real estate property into said memory.

4. The system of claim 3, wherein said at least one processor further configured to use any of said position determining devices and at least one mobile computerized device video camera, to automatically determine an identity of said at least a portion of said tour real estate property according to any of:

a) using said at least one processor and said orientation sensors to determine any of a device altitude angle and azimuth angle of said device pointing direction, and determine a offset location of said at least a portion of said tour real estate property, relative to a device location of said personal mobile computerized device, and use both said offset and device locations to determine said identity of said at least a portion of said tour real estate property and b) using said at least one processor and at least one mobile computerized device video camera, and computer image recognition algorithms to automatically recognize an appearance of said at least a portion of said tour real estate property, and correlate said appearance of said at least a portion of said tour real estate property with an identity of said at least a portion of said tour real estate property.

5. The system of claim 2, wherein, said tour real estate property is a multi-story property, and said at least one processor is further configured to use said position determining devices to further automatically determine an altitude and story level of said personal mobile computerized device; and wherein said data comprises real estate information pertaining to any of floor plans and other floor specific information for any of a plurality of stories of said tour real estate property that encompasses said altitude; and wherein said at least one processor is further configured to load said data by using said story level of said personal mobile computerized device to retrieve said real estate property information pertaining to floor plans for any of a plurality of stories of said tour real estate property that encompasses said altitude.

6. The system of claim 2, wherein said data comprises images comprising information pertaining to at least one of property information and at least one possible future remodeling change of said tour real estate property.

7. The system of claim 1, wherein said personal mobile computerized device additionally comprises at least one video camera;

said at least one processor further configured to use said at least one video camera to obtain video of at least a portion of a surroundings of said personal mobile computerized device, thereby producing video images of a present appearance of said tour real estate property;

said at least one processor further configured to use said video camera, said images comprising information pertaining to at least one of property information and at least one possible future remodeling change of said tour real estate property to, during a real-world tour of said property, simultaneously show both location and orientation adjusted images pertaining to at least one of said at least one of property information and at least one possible future remodeling change of said tour real estate property; and display said video images of a present appearance of said tour real estate property on said user interface.

8. The system of claim 7, wherein said at least one processor is further configured to simultaneously show both location and orientation adjusted images pertaining to said at least one of property information and at least one possible future remodeling change of said tour real estate property, and said video images of a present appearance of said tour real estate property, are displayed on said user interface, as at least one of non-transparent and semi-transparent overlays of said at least one of property information and at least one possible future remodeling change overlaid on said video images of a present appearance of said tour real estate property.

9. The system of claim 1, wherein said property information comprises any of rent, building size, available space for lease, property broker name, property broker contact information, landlord name, landlord website, descriptions describing said real estate properties, descriptions describing characteristics of regions surrounding said real estate property, and descriptions describing characteristics of said real estate property.

10. The system of claim 1, wherein said personal mobile computerized device is an augmented reality headset with at least one semi-transparent lens and headset display configured to allow the user to simultaneously view both the outside world and said headset display; and
   wherein said processor is further configured to use said headset display to further display said at least some information pertaining to said tour real estate property as an augmented reality overlay on said view of said outside world.

11. The system of claim 1, wherein said personal mobile computerized device is a smartphone or tablet computer equipped with at least one video camera and video display, said at least one video camera configured to allow the user to use said video camera to simultaneously view both the outside world and said display;
   and wherein said processor is further configured to use said display to further display said at least some information pertaining to said tour real estate property as an augmented reality overlay on said view of said outside world.

12. The system of claim 1, wherein said personal mobile computerized device additionally comprises a GPS receiver;
   wherein said processor is further configured to display at least some information on said user interface when triggered by a location of said personal mobile computerized device that is relative to at least one of said tour real estate property, during a real-world tour of said real estate property, as determined by at least one of said GPS receiver and said at least one wireless transceiver.

13. The system of claim 1, wherein said at least some information comprises any of available real estate, real estate specifications, real estate price, real estate property information, real estate open house dates and times, contact information telephone number, contact information email, contact information text message information, contact information video conference information, and surrounding amenities information.

14. The system of claim 1, wherein said at least one reference property and said plurality of comp real estate property have, on an individual basis, a plurality of Key Site Driver (KSD) numeric descriptors describing their characteristics;
   wherein said processor is further configured to receive a plurality of different KSD variables for ideal version(s) of said at least one reference property from the user interface of said personal mobile computerized device, and further receive, from said user interface, relative importance coefficients for each individual KSD variable in said plurality of KSD variables, thus creating and entering into said memory a KSD function that produces a property specific KSD number that describes said reference and comp real estate properties;
   further using said at least one processor further configured to ensure that a sum of all of said relative importance coefficients in said plurality of KSD's variables is equal to 100%;
   said at least one processor further configured to use said user to, for at least one tour real estate property, assign values to at least some of said KSD variables and store these values into memory; and
   said at least one processor further configured to use said KSD function to create at least one KSD number that describes a tour real estate property.

15. A computerized system for conducting real estate real-world tours, said system comprising:
   a personal mobile computerized device comprising at least one processor, memory, a graphical user interface, and at least one wireless transceiver, and at least one location determining device;
   said location determining device configured to automatically bring up various site information as the device approaches the site;
   said at least one processor configured to load computer readable tour real estate property and positions of said tour real estate property into said memory in a manner that said personal mobile computerized device retains tour real estate property information on at least one of a stand-alone basis and as part of a wireless networked system with external servers;
   said at least one processor configured to use said at least one location determining device to display at least some information pertaining to said tour real estate property on said user interface according to a location of said personal mobile computerized device during said real estate real-world tour.

16. The system of claim 15, wherein said personal mobile computerized device additionally comprises position determining devices comprising at least a GPS receiver, an orientation sensor, and an accelerometer;
   said at least one processor further configured to load data comprising information pertaining to property information of at least a portion of said tour real estate property into said memory;
   said at least one processor further configured to use said position determining devices to automatically, using said at least one processor, determine a location and orientation of said personal mobile computerized device; and,
   said at least one processor further configured to display on said user interface, during a real-world tour of said property, location and orientation adjusted data pertaining to any of at least a portion of said property information and said tour real estate.

17. The system of claim 16, wherein said at least one processor further configured to use any of said position determining devices and at least one mobile computerized device video camera, to automatically, determine an identity of said at least a portion of said tour real estate property when a user positions said personal mobile computerized device within a suitable proximity of said tour real estate property so as to point with a device pointing direction towards at least a portion of said tour real estate property; and
   said at least one processor further configured to use said identity of said at least a portion of said tour real estate property to further load said data comprising information pertaining to property information of at least a portion of said tour real estate property into said memory.

18. The system of claim 17, wherein said at least one processor further configured to use using any of said position determining devices and at least one mobile computerized device video camera, to automatically determine an identity of said at least a portion of said tour real estate property according to any of:
   a) using said at least one processor and said orientation sensors to determine any of a device altitude angle and azimuth angle of said device pointing direction, and determine a offset location of said at least a portion of said tour real estate property, relative to a device location of said personal mobile computerized device, and use both said offset and device locations to determine said identity of said at least a portion of said tour real estate property and
   b) using said at least one processor and at least one mobile computerized device video camera, and computer image recognition algorithms to automatically recognize an appearance of said at least a portion of said tour real estate property, and correlate said appearance of said at least a portion of said tour real estate property with an identity of said at least a portion of said tour real estate property.

19. The system of claim 15, wherein said personal mobile computerized device additionally comprises a GPS receiver;
   wherein said processor is further configured to display at least some information on said user interface when triggered by a location of said personal mobile computerized device that is relative to at least one of said tour real estate property, during a real-world tour of said real estate property, as determined by at least one of said GPS receiver and said at least one wireless transceiver.

20. The system of claim 15, wherein said tour real estate property information further comprises electronic lock information, and said personal mobile computerized device is configured to use said at least one processor and said electronic lock information to unlock at least one electronic lock on said property by transmitting unlock information to said at least one electronic lock.

21. The system of claim 15, wherein said tour real estate property comprises a reference real estate property and a plurality of comp real estate property;
   said at least one processor further configured to revive user input from said user interface to define real estate user customized comparable data comprising property specific values comprising at least one of numbers and images that describe said tour real estate properties;
   automatically evaluating on said at least one processor, according to said user input, multiple tour real estate properties;
   thus automatically evaluating, according to said user input, multiple tour real estate properties.

22. A non-transitory computer readable media comprising program instructions for causing at least one processor to perform the method of:
   conducting real estate real-world tours using a personal mobile computerized device comprising said at least one processor, memory, a graphical user interface, and at least one wireless transceiver, and at least one location determining device, by:
   using said at least one processor to load computer readable tour real estate property and positions of said tour real estate property into said memory in a manner that said personal mobile computerized device retains tour real estate property information on at least one of a stand-alone basis and as part of a wireless networked system with external servers;
   using said at least one processor and said location determining device to retrieve at least some tour real estate property information as the device approaches at least one tour real estate property;
   using said at least one processor and said at least one location determining device to display at least some information pertaining to said tour real estate property on said user interface according to a location of said personal mobile computerized device during said real estate real-world tour.

23. The non-transitory computer readable media of claim 22, wherein said personal mobile computerized device additionally comprises position determining devices comprising at least a GPS receiver, an orientation sensor, and an accelerometer;
   further loading data comprising information pertaining to property information of at least a portion of said tour real estate property into said memory;
   using said position determining devices to automatically, using said at least one processor, determine a location and orientation of said personal mobile computerized device;
   and, during a real-world tour of said property, displaying location and orientation adjusted data pertaining to any of at least a portion of said property information and said tour real estate property on said user interface.

24. The non-transitory computer readable media of claim 23, wherein when a user positions said personal mobile computerized device within a suitable proximity of said tour real estate property so as to point with a device pointing direction towards at least a portion of said tour real estate property;
   using any of said position determining devices and at least one mobile computerized device video camera, to automatically, using said at least one processor, determine an identity of said at least a portion of said tour real estate property; and
   using said identity of said at least a portion of said tour real estate property to further load said data comprising information pertaining to property information of at least a portion of said tour real estate property into said memory.

25. The non-transitory computer readable media of claim 24, wherein using any of said position determining devices and at least one mobile computerized device video camera, to automatically, using said at least one processor, determine an identity of said at least a portion of said tour real estate property further comprises any of:
   a) using said orientation sensors to determine any of a device altitude angle and azimuth angle of said device pointing direction, and using said at least one processor to determine a offset location of said at least a portion of said tour real estate property, relative to a device location of said personal mobile computerized device, and use both said offset and device locations to determine said identity of said at least a portion of said tour real estate property and
   b) using said at least one mobile computerized device video camera to automatically, using said at least one processor, use computer image recognition algorithms to recognize an appearance of said at least a portion of said tour real estate property, and correlate said appearance of said at least a portion of said tour real estate property with an identity of said at least a portion of said tour real estate property.

26. The non-transitory computer readable media of claim 22, wherein said personal mobile computerized device additionally comprises a GPS receiver;

wherein displaying at least some information on said user interface is triggered by a location of said personal mobile computerized device that is relative to at least one of said tour real estate property, during a real-world tour of said real estate property, as determined by at least one of said GPS receiver and said at least one wireless transceiver.

27. The non-transitory computer readable media of claim 22, wherein said tour real estate property information further comprises electronic lock information enabling said personal mobile computerized device and said at least one processor to unlock at least one electronic lock on said property by transmitting unlock information to said at least one electronic lock.

28. The non-transitory computer readable media of claim 22, wherein said tour real estate property comprises a reference real estate property and a plurality of comp real estate property;

further using said user interface to define real estate user customized comparable data comprising property specific values comprising at least one of numbers and images that describe said tour real estate properties;

automatically evaluating on said at least one processor, according to said property specific values, multiple tour real estate properties;

thereby allowing said real estate user to evaluate multiple tour real estate properties and better understand how each tour real estate property would meet the needs of said real estate user.

* * * * *